(12) United States Patent
Aurongzeb et al.

(10) Patent No.: US 12,713,172 B2
(45) Date of Patent: Aug. 18, 2026

(54) SYSTEM AND METHOD OF AUTOMATIC SWITCHING OF AUDIO OUTPUT BETWEEN AN AUDIO HEADSET AND A SPEAKER DOCKING STATION

(71) Applicant: Dell Products LP, Round Rock, TX (US)

(72) Inventors: Deeder M. Aurongzeb, Austin, TX (US); Peng Lip Goh, Singapore (SG); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 109 days.

(21) Appl. No.: 18/642,818

(22) Filed: Apr. 23, 2024

(65) Prior Publication Data

US 2025/0330738 A1 Oct. 23, 2025

(51) Int. Cl.

*H04R 1/10* (2026.01)
*G06F 3/16* (2006.01)
*H04R 1/1025* (2026.01)
*H04R 5/033* (2006.01)

(52) U.S. Cl.

CPC ........... *H04R 1/1041* (2013.01); *G06F 3/162* (2013.01); *H04R 1/1008* (2013.01); *H04R 1/1025* (2013.01); *H04R 1/105* (2013.01); *H04R 2420/07* (2013.01)

(58) Field of Classification Search

None

See application file for complete search history.

(56) References Cited

U.S. PATENT DOCUMENTS

| | | | |
|---|---|---|---|
| 7,876,921 | B2 | 1/2011 | Harvey |
| 8,391,535 | B1 | 3/2013 | Harvey |
| 9,769,858 | B2 | 9/2017 | Seymour |
| 10,798,548 | B2 | 10/2020 | Choi |

(Continued)

FOREIGN PATENT DOCUMENTS

CN 103354994 A * 10/2013 ............. H04W 4/80

OTHER PUBLICATIONS

Logitech, “Logi Dock datasheet”. 4 pages. Aug. 2022. (Year: 2022).*

*Primary Examiner* — Qin Zhu

(74) *Attorney, Agent, or Firm* — Prol Intellectual Property Law, PLLC; H. Kenneth Prol

(57) ABSTRACT

An audio headset having an automatic audio output device switching system may comprise an audio headset communication pin in an audio headset pin connector housing for operative coupling with a speaker docking station communication pin upon insertion of the audio headset pin connector housing within a speaker docking station pin connector housing, a port router operably connected to a headset audio driver, the audio headset communication pin, and a network interface device, for routing an audio signal received via the network interface device from an operatively coupled information handling system to the audio headset communication pin or the headset audio driver, and a hardware processor executing code instructions to detect a triggering event for automatically switching audio output devices and to instruct the port router to route the audio signal to a speaker docking station for output at the speaker docking station, via the audio headset communication pin.

20 Claims, 8 Drawing Sheets

(56) References Cited

U.S. PATENT DOCUMENTS

| | | | | |
|---|---|---|---|---|
| 2010/0260362 | A1* | 10/2010 | Sander | H04R 1/1041<br>381/1 |
| 2011/0317856 | A1 | 12/2011 | Akasu | |
| 2013/0177165 | A1* | 7/2013 | Oishi | H04R 1/105<br>381/74 |
| 2015/0124994 | A1* | 5/2015 | Cheung | H04R 5/04<br>381/77 |
| 2015/0296291 | A1* | 10/2015 | Macours | H04S 7/308<br>381/74 |
| 2017/0104352 | A1* | 4/2017 | Stratton | H02J 7/0044 |
| 2017/0289668 | A1* | 10/2017 | Kim | H04M 1/6066 |
| 2020/0404409 | A1* | 12/2020 | Chen | H02J 50/12 |
| 2022/0386013 | A1* | 12/2022 | Kelley | H02J 50/20 |
| 2023/0199988 | A1* | 6/2023 | Wu | G06F 3/165<br>361/679.01 |
| 2023/0353667 | A1* | 11/2023 | Kim | H04M 1/05 |
| 2025/0306847 | A1* | 10/2025 | Afzali | G06F 3/162 |

* cited by examiner

502

Form an audio headset pin connector housing and dispose a plurality of electrically conductive audio headset power and communication pins within the audio headset pin connector housing such that the plurality of audio headset power and communication pins may operatively couple with a plurality of speaker docking station power and communication pins when the audio headset pin connector housing is disposed within a speaker docking station pin connector housing

504

Operatively couple audio headset network interface device to audio headset port router capable of routing an audio signal received via the audio headset network interface device from an operatively coupled information handling system through multiple ports

506

Operatively couple headset audio driver for audio headset to port of audio headset port router and to one or more audio headset speakers such that headset audio driver for audio headset causes audio headset speakers to emit sound according to audio signal received from audio headset network interface device when routed to headset audio driver by audio headset port router

508

Operatively couple audio headset port router to one or more audio headset communication pins housed within the audio headset pin connector housing

510

Operatively couple audio headset batteries to one or more audio headset power pins housed within the audio headset pin connector housing for receiving electrical current from speaker docking station

512

Operatively couple hardware processor of audio headset executing code instructions of the automatic audio output device switching system to audio headset batteries such that hardware processor may detect electrical current supplied to audio headset batteries via one or more audio headset power pins (A)

FIG. 5

SYSTEM AND METHOD OF AUTOMATIC SWITCHING OF AUDIO OUTPUT BETWEEN AN AUDIO HEADSET AND A SPEAKER DOCKING STATION

FIELD OF THE DISCLOSURE

The present disclosure generally relates to an audio headset for use with an information handling system and for chargeable docking and audio output and audio input function switching with a speaker docking station. More specifically, the present disclosure relates to the assembly of an audio headset incorporating an automatic audio output device switching system for automatically routing an audio signal received from an operatively coupled information handling system to output at either an audio headset speaker, when the headset is worn by a user, or to a speaker docking station speaker when the audio headset is docked with the speaker docking station.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices or wireless connectivity to wireless peripheral input/output devices that may also include a wired or wireless audio headset or a speaker docking station device, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
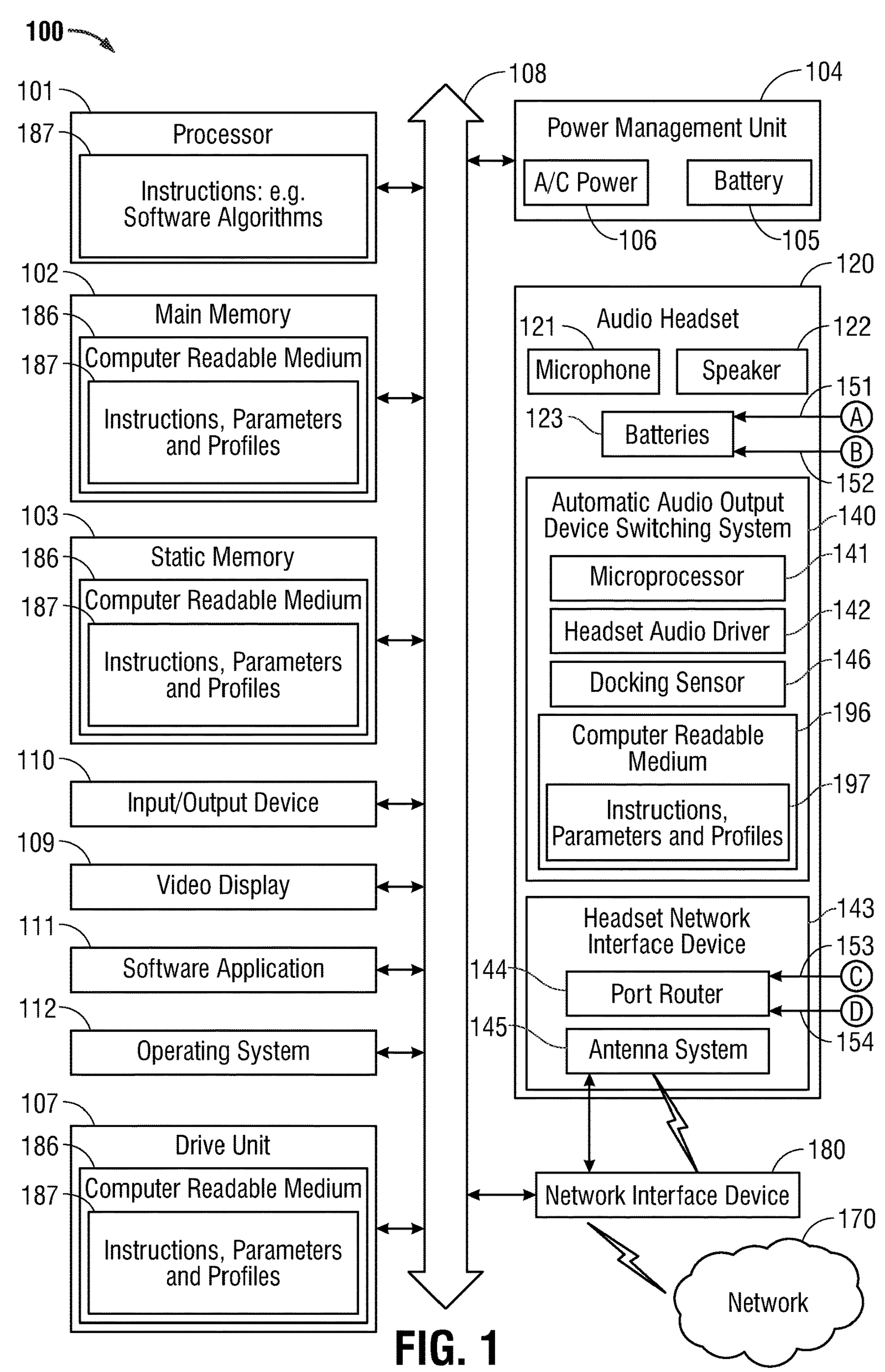
FIG. 1 is a block diagram illustrating an information handling system operatively coupled to an audio headset with an automatic audio output device switching system and a speaker docking station according to an embodiment of the present disclosure.
Figure 1:
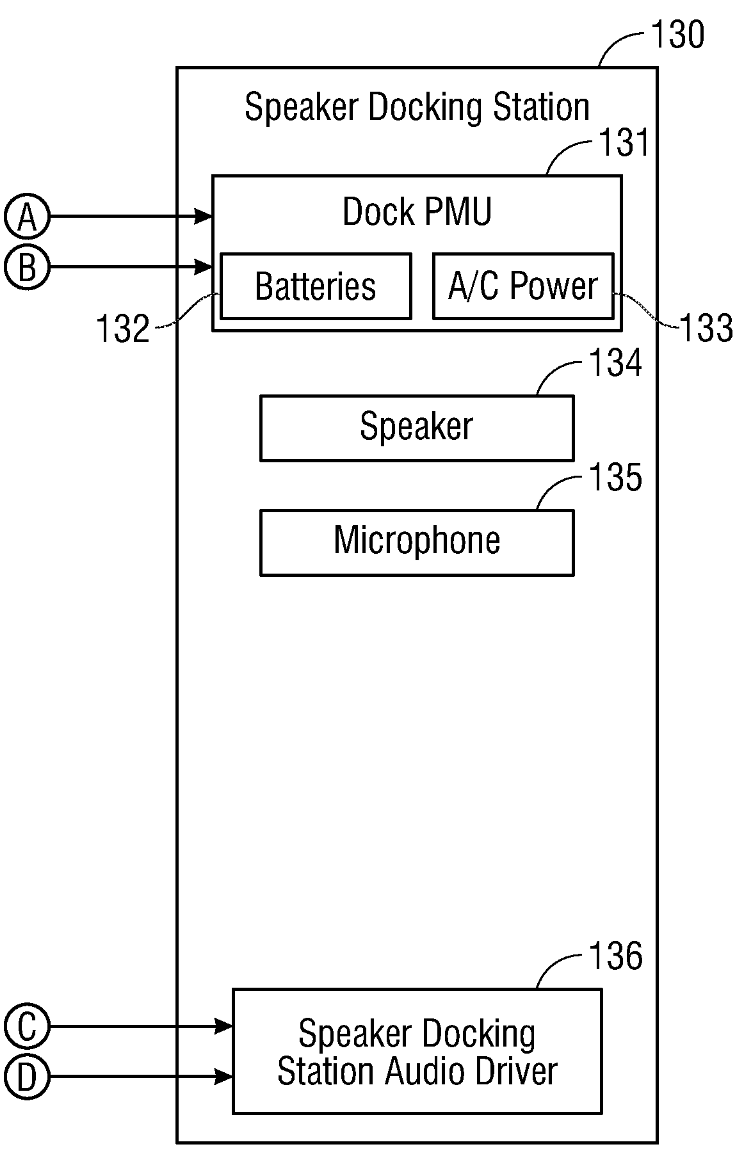

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of audio headsets sometimes wish to switch an audio signal to which they are currently listening via the audio headset, such as a specific song, podcast, or output from a specific application to a separate external speaker that is audible to multiple people within a given space. In existing systems, such a switching of audio output devices, or handoff of audio signals from one audio device to another may involve several steps, including operatively coupling the new audio output device directly to the information handling system and disconnecting the previously used audio output device, or multiple software steps executed at the previously used or new audio output device for a handing off of the audio signal from one to the other. Internally, these steps taken by the user may cause hardware processors of the various audio output devices to search among available drivers and engage in a series of handshakes to perform a successful handing off of the audio signal. A method that automates this process when two audio output devices are operatively coupled, such as a wireless audio headset with a speaker docking station is needed for convenience of users.

The automatic audio output device switching system in embodiments of the present disclosure address these issues by automatically detecting when an audio headset is docked with a speaker docking station that incorporates an external speaker, and automatically directing the audio signal received at the audio headset from an operatively coupled information handling system to an audio driver at the speaker docking station via an electrically conductive connection between communication pins of the audio headset and the speaker docking station that may come into electrically conductive contact with one another upon such a docking. For example, upon startup of an audio headset, and while being worn by a user (e.g., not docked with the speaker docking station) an audio headset network interface device may operatively couple to an information handling system via a wired or wireless link to receive an audio signal from the information handling system at an audio headset network interface device of the audio headset. For example, an audio headset may have a radio system to operatively couple to the information handling system via a Bluetooth® or Bluetooth® Low Energy (BLE) wireless link. An audio headset port router of the audio headset network interface device may then direct the audio signal incoming from the information handling system to a headset audio driver, which may cause the audio headset speakers to emit sound according to the received audio signal. The audio headset port router of the audio headset network interface device may also direct the audio signal incoming from a microphone at the audio headset via the headset audio driver to the information handling system.

The user may later place the audio headset on the speaker docking station, which may cause operative coupling between one or more audio headset power and communication pins within an audio headset pin connector housing attached to the audio headset earcup assembly with one or more speaker docking station power and communication pins within a speaker docking station pin connector housing. Electrical current may then pass through the speaker docking station power pins in the speaker docking station pin connector housing to the audio headset power pins in the audio headset pin connector housing, supplying power from the speaker docking station power management unit (PMU) to one or more audio headset rechargeable batteries.

A hardware processor of the audio headset in embodiments herein may execute code instructions of the automatic audio output device switching system to detect power supplied to the audio headset from the speaker docking station, via the audio headset power pin(s), or other headset docking triggering event for automatically switching between audio output devices. Upon such a detection, the hardware processor of the audio headset may also execute code instructions of the automatic audio output device switching system to instruct the audio headset port router within the audio headset network interface device to route the audio signal received at the audio headset network interface device from the information handling system to the speaker docking station audio driver, via one or more audio headset communication pins that are operatively coupled to one or more speaker docking station communication pins. The hardware processor of the audio headset may also execute code instructions of the automatic audio output device switching system to instruct the audio headset port router within the audio headset network interface device to route the audio signal incoming from a microphone at the speaker docking station via the speaker docking station audio driver and audio headset communication pins to the information handling system.

The headset audio driver may then cease receiving the audio signal from the information handling system, the audio headset speakers may cease emitting sound, and the microphone at the audio headset may cease recording audio input. Upon the speaker docking station audio driver receiving the audio signal from the audio headset network interface device, via the speaker docking station communication pins, the speaker docking station audio driver may cause the speaker docking station speaker(s) to emit sound at its external speaker according to the audio signal received indirectly from the information handling system, via the audio headset network interface device. Further, upon the speaker docking station audio driver receiving a recorded audio signal from a microphone at the speaker docking station, the speaker docking station audio driver may transmit the recorded audio signal to the audio headset port router via the audio headset communication pins, for further transmission to the operatively coupled information handling system. This process may proceed automatically, without any additional steps executed via software by a user, or any handshake procedures between the various audio drivers.

If the user later undocks the audio headset from the speaker docking station to wear the audio headset again, the hardware processor of the audio headset may detect a second audio output device docking switching trigger, such as cessation of power supplied to the audio headset battery from the speaker docking station PMU. In such a case, the hardware processor of the audio headset may execute code instructions of the automatic audio output device switching system to instruct the audio headset port router to automatically route the audio signal received from the information handling system to the headset audio driver. The audio headset port router may then direct the audio signal incoming from the information handling system to the headset audio driver, which may cause the audio headset speakers to emit sound according to the received audio signal. The audio headset port router of the audio headset network interface device may also direct the audio signal incoming from a microphone at the audio headset via the headset audio driver to the information handling system. In such a way, the automatic audio output device switching system in embodiments herein may automatically detect when an audio headset is docked with a speaker docking station that incorporates an external speaker, or removed from such a speaker docking station, and automatically direct the audio signal received at the audio headset from an operatively coupled information handling system to an audio driver at the speaker docking station for emission at the speaker docking station speaker, or automatically direct the audio signal to a headset audio driver at the audio headset for emission at the audio headset, without any additional steps executed via software by a user, or any handshake procedures between the various audio drivers.

FIG. 1 illustrates an information handling system 100 according to several aspects of the present disclosure. In various embodiments described herein, an audio headset 120, which may comprise a wired or wireless audio headset may be operatively coupled to the information handling system 100 such that an audio signal transmitted by the network interface device 180 of the information handling system 100 may be received at an audio headset network interface device 143 at the audio headset 120. The audio headset 120 may also include a microphone 121 to receive audio input from a user. As described herein, the automatic audio output device switching system 140 in an embodiment may automatically detect when an audio headset 120 is docked with a speaker docking station 130 that incorporates an external speaker 134 and microphone 135, or removed from such a speaker docking station 130, and automatically direct the audio signal received at the audio headset 120 from the operatively coupled information handling system 100 to an audio driver 136 at the speaker docking station 130 for emission at the speaker docking station speaker 134, or receiving via speaker docking station microphone 135, or automatically direct the audio signal to a headset audio driver 142 at the audio headset 120 for emission at the audio headset speaker 122, or receiving from the headset microphone 121, without any additional steps executed via software by a user, or any handshake procedures between the various audio drivers (e.g., 142 and 136).

The audio headset 120 may include computer readable medium 196 that is volatile (e.g. random-access memory, etc.), nonvolatile memory (read-only memory, flash memory etc.) or any combination thereof), one or more hardware processing resources, such as a digital signal processor (DSP), microcontroller or even a central processing unit (CPU), any one or more of which may be the hardware processor 141 illustrated in FIG. 1, hardware control logic, or any combination thereof. The audio headset 120 may alternatively execute code instructions 197, via one or more hardware processing resources that may operate on servers or systems, remote data centers, or on-box in individual client information handling systems 100, and are received at the audio headset 120 according to various embodiments herein. In some embodiments, it is understood any or all portions of code instructions 197 may operate on a plurality of information handling systems, such as information handling system 100, audio headset 120, or speaker docking station 130.

A plurality of audio headset power pins (not shown) may operatively couple with a plurality of speaker docking station power pins (not shown) to form electrically conductive connections 151 or 152 when the audio headset pin connector housing (not shown) is disposed within a speaker docking station pin connector housing (not shown) for both power and data. A plurality of audio headset connector pins (not shown) may operatively couple with a plurality of speaker docking station connector pins (not shown) to form electrically conductive connections 153 or 154 when the audio headset pin connector housing (not shown) is disposed within a speaker docking station pin connector housing (not shown). The electrically conductive connectors 151, 152, 153, or 154 may be of the same standard reciprocal type, but any standard type of power connector may be employed, such as Universal Serial Bus (USB) Types A, B, C, mini-USB, micro-USB, lightning, coaxial, and male and female direct current (DC) adapters.

An audio headset network interface device 143 in an embodiment may be operatively coupled to or include an audio headset port router 144 capable of routing an audio signal received via the audio headset network interface device 143 from an operatively coupled information handling system 100 through multiple ports, such as to the headset audio driver 142 or to the speaker docking station audio driver 136. In some embodiments, the audio headset 120 may be part of a wired audio headset that is operatively coupled to the information handling system 100 via a wired connection, such as a universal serial bus (USB) connection of network interface device 180 or other port hardware. In other embodiments, the audio headset 120 may be part of a wireless audio headset that is operatively coupled to the information handling system 100 via a wireless link established through the antenna system 145 of the audio headset network interface device 143 having a wireless adapter.

The audio headset network interface device 143 may provide connectivity of the audio headset 120 to the information handling system 100, the speaker docking station 130, or to the network 170 via a network access point (AP) in an embodiment. The audio headset network interface device 143 may include wired port hardware as part of headset port router 144. Audio headset network interface device 143 may also include a wireless adapter with a radio, radio frequency (RF) front end, antenna system 145 and other components. The audio headset network interface device 143 may be wirelessly coupled to the audio headset 120, such as a wireless headset or wireless mobile speaker device, via Bluetooth® or Bluetooth® Low Energy (BLE) wireless link in embodiments herein. In some aspects of the present disclosure, the audio headset network interface device 143 may operate two or more wireless links.

The audio headset network interface device 143 may operate in accordance with any cellular wireless data communication standards in some embodiments. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments.

Various firmware or software modules comprising application instructions 197 may execute via the hardware processor 141. Application instructions 197 may include any application processing drivers such as headset audio driver 142, or the like executing on audio headset 120. Application instructions 197 may include firmware or software that communicates with other software such as gaming or streaming software that includes audio interfaces from the information handling system 100.

A headset audio driver 142 for the audio headset 120 may be operatively coupled in an embodiment to a port of an audio headset port router 144 and to one or more audio headset speakers 122, such that the headset audio driver 142 for the audio headset 120 causes one or more audio headset speakers 122 to emit sound according to the audio signal received from the audio headset network interface device 143 and routed to the headset audio driver 142 by the audio headset port router 144. The audio headset speakers 122 in an embodiment may be, for example, audio actuators (e.g., piezoelectric actuator, linear resonant actuator, voice coil actuator) acting in tandem with an actuator diaphragm to produce sound. In other embodiments, the audio headset speakers 122 may comprise any type of electroacoustic transducers now known or later developed for use in headsets. An audio headset microphone 121 may be operatively coupled in an embodiment to a port of the audio headset port router 144 and to a wired or wireless link (e.g., via antenna system 145) to the information handling system 100, such that a recorded audio signal received at the audio headset microphone 121 may be transmitted to the audio headset network interface device 143 and the information handling system 100 by the audio headset port router 144.

The audio headset port router 144 in an embodiment may be operatively coupled to one or more audio headset communication pins (not shown) housed within the audio headset pin connector housing (not shown) for establishing the electrically conductive connections 153 or 154 for power or audio data. One or more audio headset batteries 123 may be operatively coupled in an embodiment to one or more audio headset power pins (not shown) housed within the audio headset pin connector housing (not shown) for receiving electrical current from the speaker docking station 130, via the electrically conductive connection 151 or 152. The audio headset battery 123 may supply power to the audio headset 120, and to one or more components of the audio headset 120, including the hardware processor such as microcontroller 141, the headset audio driver 142, the speaker 122, the microphone 121, the audio headset network interface device 143, or other components of the audio headset 120. A hardware processor such as microcontroller 141 of the audio headset 120 in an embodiment executing code instructions 197 of the automatic audio output device switching system 140 may be operatively coupled to the audio headset batteries 123, such that hardware processor such as microcontroller 141 may detect electrical current supplied to the audio headset batteries 123 via one or more audio headset power pins (not shown) used to receive electrical current from the speaker docking station 130 via the electrically conductive connection 151 or 152.

The hardware processor such as microcontroller 141 of the audio headset 120 in an embodiment may be operatively coupled to the audio headset port router 144. In an embodiment, the hardware processor such as microcontroller 141 may instruct the audio headset port router 144 to route the audio signal received from the information handling system 100, via the audio headset network interface device 143, to the speaker docking station 130 via one or more audio headset communication pins (not shown) used to establish the electrically conductive connections 153 or 154, when they are operatively coupled to one or more speaker docking station communication pins (not shown), as indicated by a detected audio output device docking switching trigger. Such an audio output device docking switching trigger in various embodiments herein may include detection by the hardware processor such as microcontroller 141 that no electrical current is passing from the speaker docking station 130 to the audio headset batteries 123 via the electrically conductive connections 151 or 152, or indication by a sensor, such as a pressor sensor or other docking sensor 146, that the audio headset 120 is docked at the speaker docking station 130.

A plurality of audio headset power pins (not shown) may operatively couple with a plurality of speaker docking station power pins (not shown) to form electrically conductive connections 151 or 152 for power when the audio headset pin connector housing (not shown) is disposed within a speaker docking station pin connector housing (not shown). A plurality of audio headset connector pins (not shown) may operatively couple with a plurality of speaker docking station connector pins (not shown) to form electrically conductive connections 153 or 154 for audio data when the audio headset pin connector housing (not shown) is disposed within a speaker docking station pin connector housing (not shown). Power and data may also be shared on electrically conductive connections 151 and 152 in some embodiments. A speaker docking station audio driver 136 in an embodiment may operatively couple to one or more speaker docking station communication pins (not shown) housed within the speaker docking station pin connector housing (not shown) for receiving an audio signal transmitted via the electrically conductive connection 153 or 154 by the information handling system 100, via the audio headset 120 when the one or more speaker docking station communication pins (not shown) are operatively coupled with one or more audio headset communication pins (not shown) to establish the electrically conductive connection 153 or 154.

The speaker docking station audio driver 136 in an embodiment may be operatively coupled to one or more speaker docking station speakers 134, such that speaker docking station audio driver 136 causes speaker docking station speakers 136 to emit sound according to the audio signal received from the audio headset 120, via the electrically conductive connections 153 or 154 established using the one or more speaker docking station communication pins (not shown). The speaker docking station speaker 134 in an embodiment may be, for example, an audio actuator (e.g., piezoelectric actuator, linear resonant actuator, voice coil actuator) acting in tandem with an actuator diaphragm to produce sound. In other embodiments, the speaker docking station speaker 134 may comprise any type of external speaker or electroacoustic transducer now known or later developed. The speaker docking station 130 may also include a microphone 135 to receive audio input from a user. The speaker docking station microphone 135 may be operatively coupled in an embodiment to the audio headset port router 144 via the speaker docking station audio driver 136 and the electrically conductive connections 153 or 154, such that a recorded audio signal received at the speaker docking station microphone 135 may be transmitted to the audio headset network interface device 143 and the information handling system 100 by the audio headset port router 144.

A speaker docking station power management unit (PMU) 131 in an embodiment may operatively couple to one or more speaker docking station power pins (not shown) housed within the speaker docking station pin connector housing (not shown) to establish the electrically conductive connections 151 or 152, such that the speaker docking station power management unit 131 may send electrical current to one or more speaker docking station power pins (not shown) when they are operatively coupled to one or more audio headset power pins (not shown) to establish the electrically conductive connections 151 or 152. The speaker docking station power management unit 131 may supply power to the speaker docking station 130, via a battery 132 or an alternating current (A/C) power adapter 133 and to one or more components of the speaker docking station 130, including the speaker docking station audio driver 136, the speaker 134, the microphone 135, or other components of the speaker docking station 130. Additionally, when the audio headset 120 is docked with the speaker docking station 130, such as when the one or more speaker docking station power pins (not shown) are operatively coupled to the one or more audio headset power pins (not shown) to establish the electrically conductive connections 151 or 152, the speaker docking station power management unit 131 may supply power to the audio headset 120, via a battery 132 or an alternating current (A/C) power adapter 133 and to one or more components of the audio headset 120, including the batteries 123, or other components of the audio headset 120. Electrically conductive connections 151 and 152 may also provide data connection from the audio headset 120 to the speaker docking station audio driver 136 in some embodiments.

Upon startup of the audio headset 120, as worn by a user, the audio headset network interface device 143 may be operatively coupled to the information handling system 100 via wired or wireless link. The audio headset port router 144 in an embodiment may then direct the audio signal incoming from information handling system 100 to the headset audio driver 142, which may cause the audio headset speakers 122 to emit sound according to the audio signal received from the network interface device 180 of the information handling system 100. The audio headset microphone 121 operatively coupled in an embodiment to a port of the audio headset port router 144 and to the information handling system 100 via antenna system 145 may record an audio signal and transmit it to the audio headset antenna system 145 and the information handling system 100, via the audio headset port router 144.

The user may then place the audio headset 120 on the speaker docking station 130. This may cause operative coupling of the audio headset power and communication pins (not shown) in audio headset pin connector housing (not shown) with speaker docking station power and communication pins (not shown) in the speaker docking station pin connector housing (not shown), to establish the electrically conductive connections 151, 152, 153, or 154. Electrical current may then pass through the electrically conductive connections 151 or 152, from the speaker docking station power pins (not shown) in the speaker docking station pin connector housing (not shown) to the audio headset power pins (not shown) in the audio headset pin connector housing (not shown). This electrical current may supply power from the speaker docking station power management unit 131 to the audio headset rechargeable batteries 123.

The hardware processor such as microcontroller 141 of the audio headset 120 may then execute code instructions 197 of the automatic audio output device switching system 140 to detect power supplied to the audio headset 120 batteries 123 from the speaker docking station 130 PMU 131 via the electrically conductive connection 151 or 152 established with the audio headset power pin(s) (not shown), or to detect another headset docking triggering event (e.g., detection by pressure docking sensor 136 of docking of the audio headset 120 with the speaker docking station 130) for automatically switching audio output devices from the audio headset 120 to the speaker docking station 130. The hardware processor such as microcontroller 141 of the audio headset 120 may then execute code instructions 197 of the automatic audio output device switching system 140 to instruct the audio headset port router 144 to route the audio signal received from the network interface device 180 of the information handling system 100 via the audio headset network interface device 143 to the speaker docking station 130 via the electrically conductive connections 153 or 154 established using the one or more audio headset communication pins (not shown) that are operatively coupled to the one or more speaker docking station communication pins (not shown).

When the headset 120 is docked, the headset audio driver 142 in an embodiment may cease receiving the audio signal from the audio headset network interface device 143 and the audio headset speakers 122 may cease emitting sound via execution of the automatic audio output device switching system 140. The speaker docking station audio driver 136 in an embodiment may then receive the audio signal from the audio headset 120, the audio headset network interface device 143, and the audio headset port router 144 via the electrically conductive connection 153 or 154 established using the speaker docking station communication pins (not shown), and may cause the speaker docking station speaker(s) 134 to emit sound according to the received audio signal. The speaker docking station microphone 135 may record an audio signal and transmit it the audio headset port router 144 via the speaker docking station audio driver 136 and the electrically conductive connections 153 or 154. The recorded audio signal received at the speaker docking station microphone 135 may then be transmitted to the audio headset network interface device 143 and the information handling system 100 via the audio headset port router 144.

The user may later remove the audio headset 120 from the speaker docking station 130. In such a scenario, the hardware processor such as microcontroller 141 of the audio headset 120 may then execute code instructions 197 of the automatic audio output device switching system 140 to detect cessation of power supplied to the audio headset 120 batteries 123 from the speaker docking station 130 PMU 131 via the electrically conductive connection 151 or 152 established with the audio headset power pin(s) (not shown), or detect another headset docking triggering event (e.g., lack of detection by pressure sensor 136 of docking of the audio headset 120 with the speaker docking station 130) for automatically switching audio output devices from the speaker docking station 130 to the audio headset 120. The hardware processor such as microcontroller 141 of audio headset 120 in an embodiment may then detect the audio output device docking switching trigger and execute code instructions 197 of the automatic audio output device switching system 140 to instruct the audio headset port router 144 to route the audio signal received from the network interface device 180 of the information handling system 100 and received at the audio headset network interface device 143 to the headset audio driver 142. The headset audio driver 142 may then cause the audio headset speaker 122 to emit sound according to the audio signal received from the information handling system 100. The audio headset microphone 121 operatively coupled in an embodiment to a port of the audio headset port router 144 and to the information handling system 100 via antenna system 145 may then record an audio signal and transmit it to the audio headset antenna system 145 and the information handling system 100, via the audio headset port router 144. In such a way, the automatic audio output device switching system 140 in an embodiment may automatically detect when an audio headset 120 is docked with a speaker docking station 130 that incorporates an external speaker 134 and speaker docking station microphone 135, or removed from such a speaker docking station 130. The automatic audio signal output device switching system 140 automatically directs the audio signal received at the audio headset 120 from an operatively coupled information handling system 100 to an audio driver 136 at the speaker docking station 130 for emission at the speaker docking station speaker 134 or from the speaker docking station microphone 153, or automatically direct the audio signal to a headset audio driver 142 at the audio headset 120 for emission at the audio headset speaker 122 or from the headset microphone 121, without any additional steps executed via software by a user, or any handshake procedures between the various audio drivers (e.g., 142 and 136).

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices, such as static memory 103 or drive unit 107, a wireless network interface device 180, and various integrated and peripheral input and output (I/O) devices 110, such as an audio headset 120, a speaker docking station 130, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 180, a static memory 103 or drive unit 107, a video display 109, audio headset 120, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The network interface device 180 may provide connectivity of the information handling system 100 to wired or wireless peripheral devices such as the audio headset 120 or to the network 170 via a network access point (AP) in an embodiment. The network interface device 180 may include wired port hardware. Network interface device 180 may be a wireless adapter with a radio, radio frequency (RF) front end, antenna and other components. The network interface device 180 may be a wireless interface adapter with a radio system and antenna system 145 that is wirelessly coupled to the audio headset 120, such as a wireless headset or wireless mobile speaker device, via Bluetooth® or Bluetooth® Low Energy (BLE) wireless link in embodiments herein. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to the audio headset 120 in an embodiment may be via wired or wireless connection. In some aspects of the present disclosure, the network interface device 180 may operate two or more wireless links. In other aspects of the present disclosure, the information handling system 100 may include a plurality of network interface devices, each capable of establishing a separate wired or wireless links to network 170 or to peripheral devices such as 110 or 120, such that the information handling system 100 may be in communication with network 170 or peripheral devices such as 110 or 120 via a plurality of wired or wireless links.

The network interface device 180 may operate in accordance with any cellular wireless data communication standards in some embodiments. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100. Application instructions 187 may include software that includes communication software or other software such as gaming or streaming software that includes audio interfaces for use with audio headset 120.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
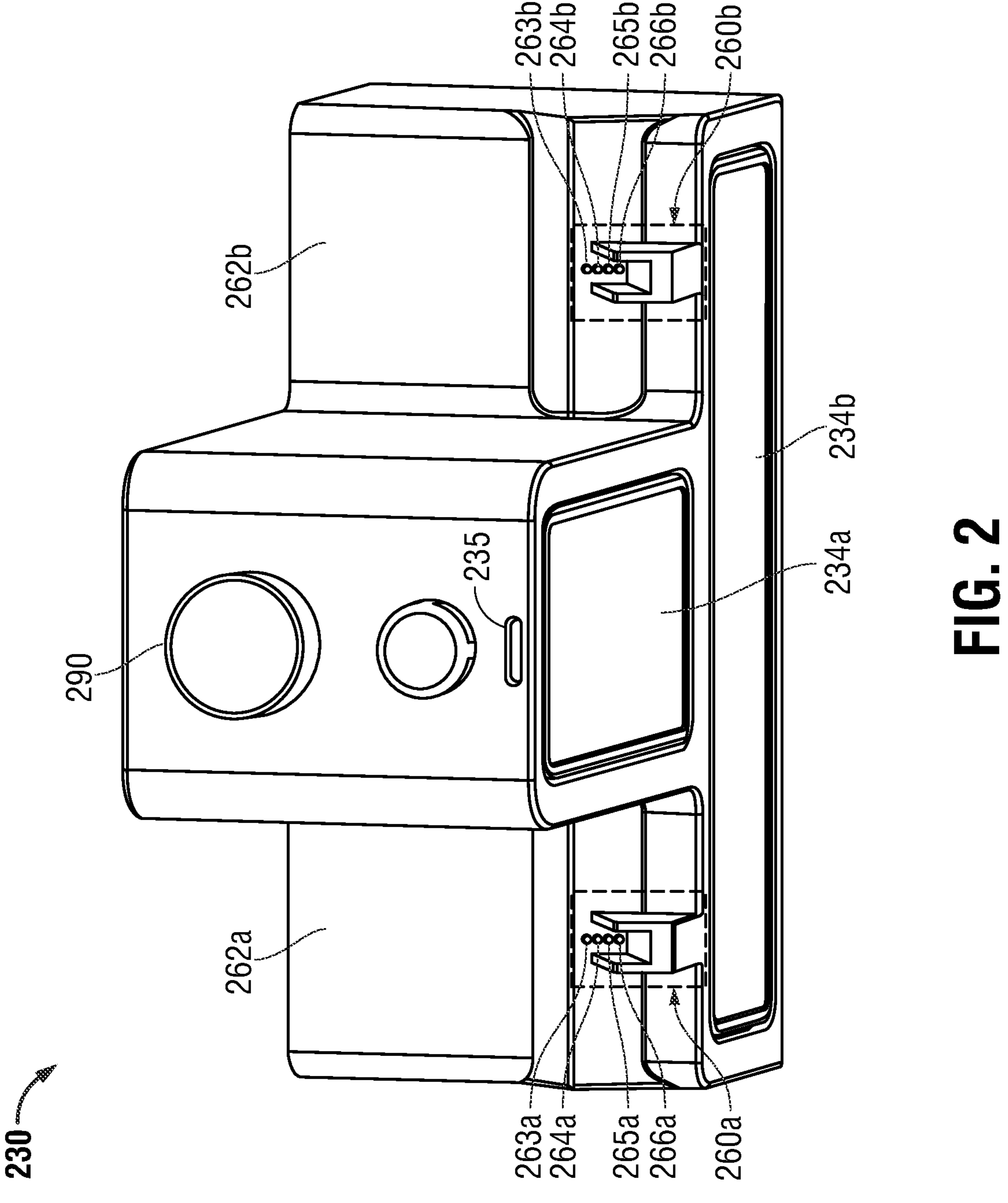
FIG. 2 is a graphical diagram illustrating a perspective view of a speaker docking station having a plurality of speaker docking station pin connector housings according to an embodiment of the present disclosure.

FIG. 2 is a graphical diagram illustrating a perspective view of a speaker docking station having a plurality of speaker docking station pin connector housings, each for receiving an inserted audio headset pin connector housing according to an embodiment of the present disclosure. A speaker docking station pin connector housing 260*a* or 260*b* in an embodiment may be formed as an exterior portion of housing for the speaker docking station 230. A plurality of electrically conductive speaker docking station power pins 263*a* and 264*a* and a plurality of electrically conductive speaker docking station communication pins 265*a* and 266*a* may be disposed within a first of the speaker docking station pin connector housings 260*a*. A plurality of electrically conductive speaker docking station power pins 263*b* and 264*b* and a plurality of electrically conductive speaker docking station communication pins 265*b* and 266*b* may be disposed within a second of the speaker docking station pin connector housings 260*b*. Further, in some embodiments, only one speaker docking station pin connector housing (e.g., 260*a* or 260*b*) may be formed to house the various speaker docking station power and communication pins (e.g., 263*a*, 264*a*, 265*a*, and 266*a*, or 263*b*, 264*b*, 265*b*, and 266*b*, respectively). It is appreciated that any of pins 263*a*, 264*a*, 265*a*, 266*a*, 263*b*, 264*b*, 265*b*, or 266*b* may be speaker docking station power pins, speaker docking station communication pins, or may serve as both power and communication pins in various embodiments. The speaker docking station power pins 263*a*, 264*a*, 263*b*, and 264*b* and the speaker docking station communication pins 265*a*, 266*a*, 265*b*, and 266*b* may be so disposed within their respective speaker docking station pin connector housings 260*a* and 260*b* such that the plurality of speaker docking station power pins 263*a*, 263*a*, 263*b*, and 264*b* and the plurality of speaker docking station communication pins 265*a*, 266*a*, 265*b*, and 266*b* may operatively couple with a plurality of audio headset power and communication pins (not shown) when an audio headset pin connector housing (not shown) is disposed within the speaker docking station pin connector housings 260*a* and 260*b*, as described in greater detail below with respect to FIGS. 3 and 4.

A speaker docking station audio driver (not shown but described at 136 of FIG. 1) in an embodiment may operatively couple to one or more speaker docking station communication pins such as 265*a*, 266*a*, 265*b*, and 266*b*, housed within the speaker docking station pin connector housings 260*a* and 260*b*, respectively, for receiving an audio signal transmitted by an information handling system (not shown, but described at 100 of FIG. 1) via an audio headset (not shown) when the one or more speaker docking station communication pins such as 265*a*, 266*a*, 265*a*, or 266*b* are operatively coupled with one or more audio headset communication pins (not shown). This is described in greater detail below with respect to FIGS. 3 and 4. The speaker docking station audio driver in an embodiment may be operatively coupled to one or more speaker docking station speakers 234*a* or 234*b*, such that speaker docking station audio driver causes the speaker docking station speakers 234*a* or 234*b* to emit sound according to an audio signal received from the audio headset and its network interface device at one or more speaker docking station communication pins such as 265*a*, 266*a*, 265*b*, or 266*b*. A button or dial 290 may be used by a user to manually stop the speaker 234*a* or 234*b* or microphone 235 from being active automatically upon docking in some embodiments. Further, button or dial 290 may also control volume or other aspects of the speaker docking station 230. A speaker docking station power management unit (not shown, but described at 131 in FIG. 1) in an embodiment may operatively couple to one or more speaker docking station power pins such as 263*a*, 264*a*, 263*b*, or 264*b*, housed within the speaker docking station pin connector housings 260*a* or 260*b* such that the speaker docking station power management unit may send electrical current to one or more speaker docking station power pins 263*a*, 264*a*, 263*b*, or 264*b* when they are operatively coupled to one or more audio headset power pins (not shown) to charge batteries of the audio headset in some embodiments.

The speaker docking station 230 may also include a microphone 235 to receive audio input from a user. The speaker docking station microphone 235 may be operatively coupled in an embodiment to an audio headset port router via the speaker docking station audio driver and the speaker docking station communication pins such as 265*a*, 266*a*, 265*b*, or 266*b*, such that a recorded audio signal received at the speaker docking station microphone 235 may be transmitted to the audio headset network interface device and an operatively coupled information handling system by the audio headset port router.

The speaker docking station power pins 263*a*, 264*a*, 263*b*, 264*b*, may operatively couple to the audio headset power pins (not shown) to form electrically conductive connectors described at 151, or 152 of FIG. 1. The speaker docking station communication pins 265*a*, 266*a*, 265*b*, 266*b*, may operatively couple to the audio headset communication pins (not shown) to form electrically conductive connectors described at 153, or 154 of FIG. 1. The speaker docking station power pins 263*a*, 264*a*, 263*b*, 264*b* may operatively couple to the audio headset power pins (not shown) to form electrically conductive connectors described at 151, or 152 of FIG. 1. The speaker docking station power pins 265*a*, 266*a*, 265*b*, or 266*b* may magnetically couple to the audio headset power pins (not shown), or the speaker docking station communication pins 263*a*, 264*a*, 263*b*, or 264*b* may also magnetically couple to the audio headset communication pins (not shown) in some embodiments. Magnetic coupling may ensure alignment and help with attachment of the headset to the speaker docking station 230 when operatively coupled.

As described herein, the automatic audio output device switching system (not shown, but described at 140 of FIG. 1) in an embodiment of may automatically detect when an audio headset (not shown) is docked with the speaker docking station 230 that incorporates an external speaker 234*a* or 234*b*, and automatically direct the audio signal received at the audio headset (not shown) from an operatively coupled information handling system (not shown, but described at 100 of FIG. 1) to an audio driver (not shown, but described at 136 of FIG. 1) at the speaker docking station 230 via an electrically conductive connection between communication pins of the audio headset and speaker docking station communication pins 265*a*, 266*a*, 265*b*, or 266*b* of the speaker docking station 230 that may come into electrically conductive contact with one another upon such a docking. A user may perform such a docking by placing an audio headset on the speaker docking station 230 to operatively couple audio headset power and communication pins (not shown) in an audio headset pin connector housing (not shown) with one or more speaker docking station power pins 265*a*, 266*a*, 265*b*, or 266*b*, and one or more speaker docking station communication pins 263*a*, 264*a*, 263*b*, or 264*b* in the speaker docking station pin connector housings 260*a* or 260*b*, respectively.

Electrical current may then pass through the speaker docking station power pins 265*a*, 266*a*, 265*b*, or 266*b* in the speaker docking station pin connector housing 260*a* or 260*b* to the audio headset power pins in the audio headset pin connector housing, supplying power from the speaker docking station power management unit (not shown, but described at 131 of FIG. 1) to the audio headset rechargeable batteries (not shown, but described at 123 of FIG. 1). A hardware processor (not shown, but described at 141 of FIG. 1) of the audio headset (not shown, but described at 120 of FIG. 1) executes code instructions of the automatic audio output device switching system to instruct the audio headset port router (not shown, but described at 144 of FIG. 1) to route an audio signal received from the information handling system (not shown, but described at 100 of FIG. 1) via the audio headset network interface device (not shown, but described at 143 of FIG. 1) to the speaker docking station 230 via one or more audio headset communication pins (not shown) that are operatively coupled to one or more speaker docking station communication pins 263*a*, 264*a*, 263*b*, or 264*b*. A speaker docking station audio driver (not shown, but described at 136 of FIG. 1) may receive the audio signal from the audio headset (not shown, but described at 120 of FIG. 1) via one or more speaker docking station communication pins 265*a*, 266*a*, 265*b*, 266*b*, and cause the speaker docking station speaker(s) 234*a* or 234*b* to emit sound according to received audio signal. The speaker docking station microphone 235 may record an audio signal and transmit it to an information handling system operatively coupled to the audio headset via the speaker docking station audio driver and the speaker docking station communication pins such as 265*a*, 266*a*, 265*b*, or 266*b*.

Figure 3:
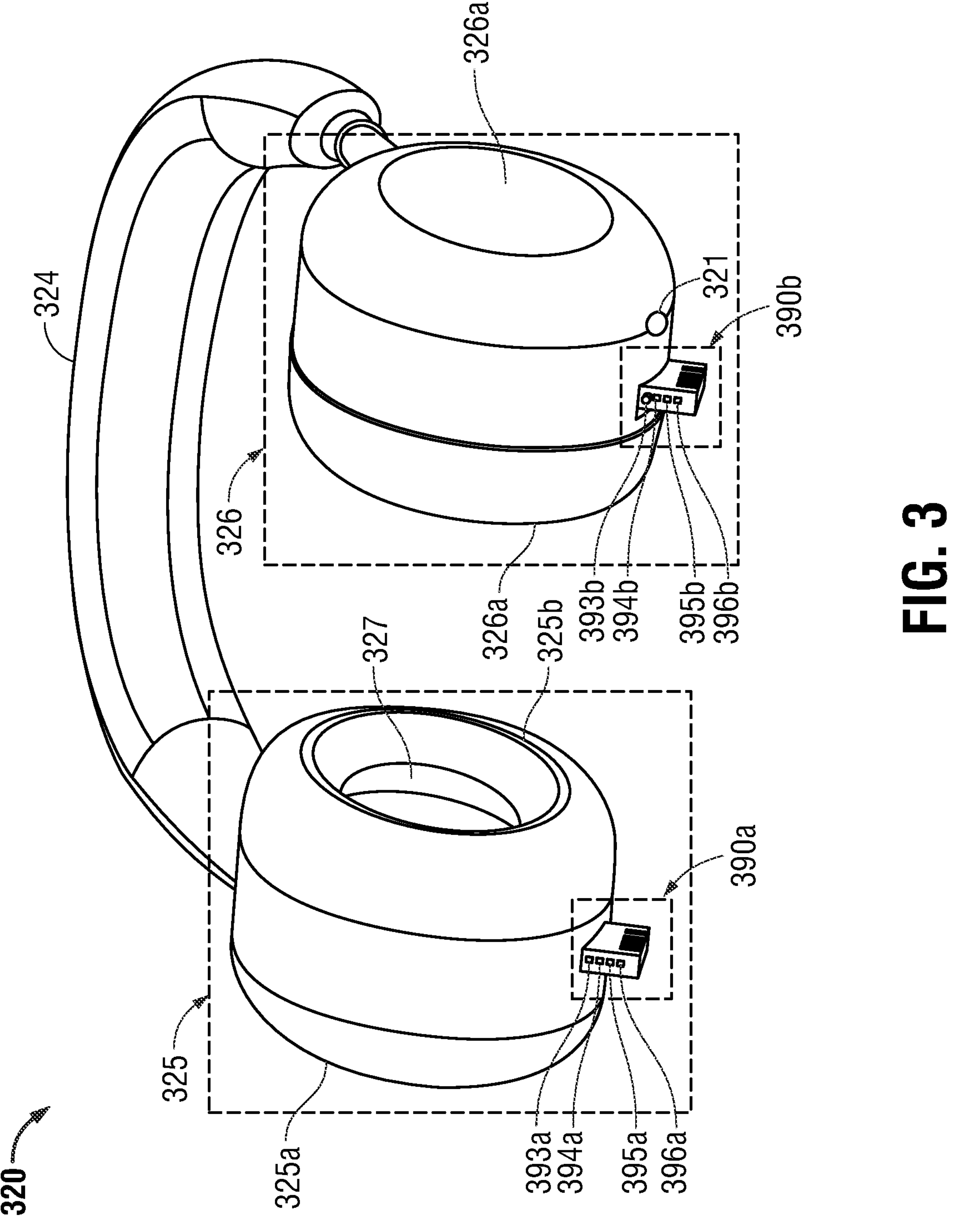
FIG. 3 is a graphical diagram illustrating a perspective view of an audio headset incorporating an automatic audio output device switching system and having a plurality of audio headset pin connector housings according to an embodiment of the present disclosure.

FIG. 3 is a graphical diagram illustrating a perspective view of an audio headset incorporating an automatic audio output device switching system and having a plurality of audio headset pin connector housings, each for insertion within a speaker docking station audio pin connector housing according to an embodiment of the present disclosure. An audio headset pin connector housing 390*a* or 390*b* in an embodiment may be formed as an exterior portion of an earcup cover 325*a* or 326*a*, respectively. An audio headset ear cup cover 325*a* or 326*a*, housing the audio headset network interface device, audio headset port router, headset audio driver, and audio headset hardware processor in an embodiment (each as described in greater detail above with respect to FIG. 1) may be operatively coupled to the audio headset pin connector housing 390*a* or 390*b*, respectively, and an audio headset ear cup cushion 325*b* or 326*b*, respectively to form an audio headset ear cup assembly 325 or 326, respectively. In an embodiment, two audio headset ear cup assemblies 325 and 326 may be operatively coupled together, via a clamping headband 324, to form the audio headset 320.

A plurality of electrically conductive audio headset power pins 393*a*, 394*a*, 393*b*, and 394*b* may be disposed within the audio headset pin connector housings 390*a* and 390*b*, respectively, such that the plurality of audio headset power pins 393*a*, 394*a*, 393*b*, and 394*b* may operatively couple with a plurality of speaker docking station power pins (not shown, but described at 263*a*, 264*a*, 263*b*, and 264*b* of FIG. 2) when the audio headset pin connector housing 390*a* or 390*b* is disposed within a speaker docking station pin connector housing (not shown, but described at 260*a* and 260*b* of FIG. 2, respectively). A plurality of electrically conductive audio headset communication pins 395*a*, 396*a*, 395*b*, and 396*b* may be disposed within the audio headset pin connector housings 390*a* and 390*b*, respectively, such that the plurality of audio headset communication pins 395*a*, 396*a*, 395*b*, and 396*b* may operatively couple with a plurality of speaker docking station communication pins (not shown, but described at 265*a*, 266*a*, 265*b*, and 266*b* of FIG. 2) when the audio headset pin connector housing 390*a* or 390*b* is disposed within a speaker docking station pin connector housing (not shown, but described at 260*a* and 260*b* of FIG. 2, respectively). Again, it is appreciated that any of pins 393*a*, 393*b*, 394*a*, 394*b*, 395*a*, 395*b*, 396*a* and 396*b* may be power pins, communication pins, or both in other embodiments.

The speaker docking station communication pins (not shown but described at 265*a*, 266*a*, 265*b*, 266*b* of FIG. 2) may operatively couple to the audio headset communication pins 395*a*, 396*a*, 395*b*, 396*b* to form electrically conductive connectors described at 153, or 154 of FIG. 1. The speaker docking station power pins (not shown but described at 263*a*, 264*a*, 263*b*, 264*b* of FIG. 2) may operatively couple to the audio headset power pins 393*a*, 394*a*, 393*b*, 394*b* to form electrically conductive connectors described at 151, or 152 of FIG. 1. The speaker docking station power pins (not shown but described at 265*a*, 266*a*, 265*b*, or 266*b* of FIG. 2) may magnetically couple to the audio headset power pins 393*a*, 394*a*, 393*b*, or 394*b*, or the speaker docking station communication pins (not shown but described at 263*a*, 264*a*, 263*b*, or 264*b* of FIG. 2) may magnetically couple to the audio headset communication pins 395*a*, 396*a*, 395*b*, 396*b* in some embodiments. Magnetic coupling may assist with pin alignment as well as provide greater attachment between the headset 320 and the speaker docking station when operatively coupled.

A headset audio driver (not shown, but described at 142 of FIG. 1) for the audio headset 320 may be operatively coupled in an embodiment to one or more audio headset speakers (e.g., 327, such that the headset audio driver (not shown, but described at 142 of FIG. 1) for the audio headset 320 causes one or more audio headset speakers 327 to emit sound according to the audio signal received from the audio headset network interface device (not shown, but described at 143 of FIG. 1) and routed to the headset audio driver (not shown, but described at 142 of FIG. 1) by the audio headset port router (not shown, but described at 144 of FIG. 1). The audio headset port router (not shown, but described at 144 in FIG. 1) in an embodiment may be operatively coupled to one or more audio headset communication pins 395*a*, 396*a*, 395*b*, or 396*b* housed within the audio headset pin connector housings 390*a* or 390*b*, respectively. An audio headset microphone 321 may be operatively coupled in an embodiment to a port of the audio headset port router and to a wired or wireless link (e.g., via antenna system) to an operatively coupled information handling system, such that a recorded audio signal received at the audio headset microphone 321 may be transmitted to the audio headset network interface device and the information handling system by the audio headset port router of the audio headset 320.

One or more audio headset batteries (not shown, but described at 123 of FIG. 1) may be operatively coupled in an embodiment to one or more audio headset power pins 393*a*, 394*a*, 393*b*, or 394*b* housed within the audio headset pin connector housings 390*a* and 390*b*, respectively for receiving electrical current from a speaker docking station (not shown, but described at 130 of FIG. 1). A hardware processor (not shown, but described at 141 of FIG. 1) of the audio headset 320 in an embodiment executing code instructions of the automatic audio output device switching system may be operatively coupled to the audio headset batteries (not shown, but described at 123 of FIG. 1), such that hardware processor may detect an electrical current supplied to the audio headset batteries via one or more audio headset power pins 393*a*, 394*a*, 393*b*, or 394*b*.

The hardware processor of the audio headset 320 in an embodiment may be operatively coupled to the audio headset port router (not shown, but described at 144 of FIG. 1). In an embodiment, the hardware processor may instruct the audio headset port router to route the audio signal received from the information handling system, via the audio headset network interface device (not shown, but described at 143 of FIG. 1), to the speaker docking station (not shown, but described at 130 of FIG. 1, and 230 of FIG. 2) via one or more audio headset communication pins 395*a*, 396*a*, 395*b*, or 396*b*, when they are operatively coupled to one or more speaker docking station communication pins, as indicated by a detected audio output device docking switching trigger. In another embodiment, the hardware processor may instruct the audio headset port router to route a recorded audio signal received from the a microphone (not shown, but described at 135 of FIG. 1) from the speaker docking station, to the information handling system via the audio headset network interface device, and one or more audio headset communication pins 395*a*, 396*a*, 395*b*, or 396*b*, when they are operatively coupled to one or more speaker docking station communication pins, as indicated by a detected audio output device docking switching trigger.

As described herein, the automatic audio output device switching system (not shown, but described at 140 of FIG. 1) in an embodiment may automatically detect when an audio headset 320 is docked with the speaker docking station that incorporates an external speaker, and automatically direct the audio signal received at the audio headset 320 from an operatively coupled information handling system to an audio driver (not shown, but described at 136 of FIG. 1) at the speaker docking station via an electrically conductive connection between audio headset communication pins 395*a*, 396*a*, 395*b*, or 396*b* of the audio headset 320 and speaker docking station communication pins of the speaker docking station that may come into electrically conductive contact with one another upon such a docking. The automatic audio output device switching system in another embodiment may automatically detect when an audio headset 320 is docked, and automatically direct a recorded audio signal received at the speaker docking station microphone to the audio driver at the speaker docking station, then to the audio headset port router via an electrically conductive connection between audio headset communication pins 395*a*, 396*a*, 395*b*, or 396*b* of the audio headset 320 and speaker docking station communication pins of the speaker docking station that may come into electrically conductive contact with one another upon such a docking. The recorded audio signal received at the speaker docking station microphone may then be transmitted to the audio headset network interface device and the information handling system via the audio headset port router. A user may perform such a docking by placing the audio headset 320 on a speaker docking station to operatively couple the audio headset power pins 393*a*, 394*a*, 393*b*, or 394*b* in the audio headset pin connector housings 390*a* and 390*b* with the speaker docking station power pins in the speaker docking station pin connector housing (not shown, but described at 260*a* and 260*b* of FIG. 2). Such docking may further operatively couple the audio headset communication pins 395*a*, 396*a*, 395*b*, or 396*b* in the audio headset pin connector housings 390*a* and 390*b* with the speaker docking station communication pins in the speaker docking station pin connector housing. Magnetic coupling of the pins in the audio headset connector housing 390*a* and 390*b* with the pins in the speaker docking station housing assist in docking the audio headset 320 in the speaker docking station in some embodiments.

Electrical current may then pass through the speaker docking station power pins in the speaker docking station pin connector housing to the audio headset power pins 393*a*, 394*a*, 393*b*, or 394*b* in the audio headset pin connector housings 390*a* and 390*b*, supplying power from the speaker docking station power management unit (not shown, but described at 131 of FIG. 1) to the audio headset rechargeable batteries (not shown, but described at 123 of FIG. 1).

A hardware processor (not shown, but described at 141 of FIG. 1) of the audio headset 320 executes code instructions of the automatic audio output device switching system to detect power supplied to the audio headset 320 from the speaker docking station via the audio headset power pin(s) 393*a*, 394*a*, 393*b*, or 394*b*, or another headset docking triggering event such as triggering a docking sensor that may be a pressure sensor for automatically switching audio output devices. A hardware processor of the audio headset 320 executes code instructions of the automatic audio output device switching system to instruct the audio headset port router to route an audio signal received from the information handling system via the audio headset network interface device (not shown, but described at 143 of FIG. 1) to the speaker docking station via the one or more audio headset communication pins 395*a*, 396*a*, 395*b*, or 396*b* that are operatively coupled to one or more speaker docking station communication pins. The headset audio driver (not shown, but described at 142 of FIG. 1) may cease to receive the audio signal from the information handling system and the audio headset speakers 327 may cease emitting sound.

A speaker docking station audio driver (not shown, but described at 136 of FIG. 1) may receive the audio signal from the audio headset 320 via one or more speaker docking station communication pins (not shown, but described at 265*a*, 266*a*, 265*b*, 266*b* of FIG. 2) and cause the speaker docking station speaker(s) (not shown, but described at 234*a* or 234*b* of FIG. 2) to emit sound according to the received audio signal. The speaker docking station microphone may record an audio signal and transmit it the audio headset port router of the audio headset 320 via the speaker docking station audio driver and the one or more speaker docking station communication pins. The recorded audio signal received at the speaker docking station microphone may then be transmitted to the audio headset network interface device of the audio headset 320 and the information handling system, via the audio headset port router. If the hardware processor (not shown, but described at 141 of FIG. 1) of the audio headset 320 later detects a second audio output device docking switching trigger, such as such as cessation of power supplied to the audio headset battery (not shown, but described at 123 of FIG. 1) from the speaker docking station PMU (not shown, but described at 131 of FIG. 1), the hardware processor of the audio headset 320 may execute code instructions to instruct the audio headset port router to route the audio signal received from the information handling system to the headset audio driver to direct emission of sound at the audio headset speaker 321 according to the received audio signal. In another aspect of an embodiment, in such a scenario, the hardware processor of the audio headset 320 may execute code instructions to instruct the audio headset port router to route a recorded audio signal from the audio headset microphone 321 to the information handling system via the headset audio driver and the audio headset network interface device.

Figure 4:
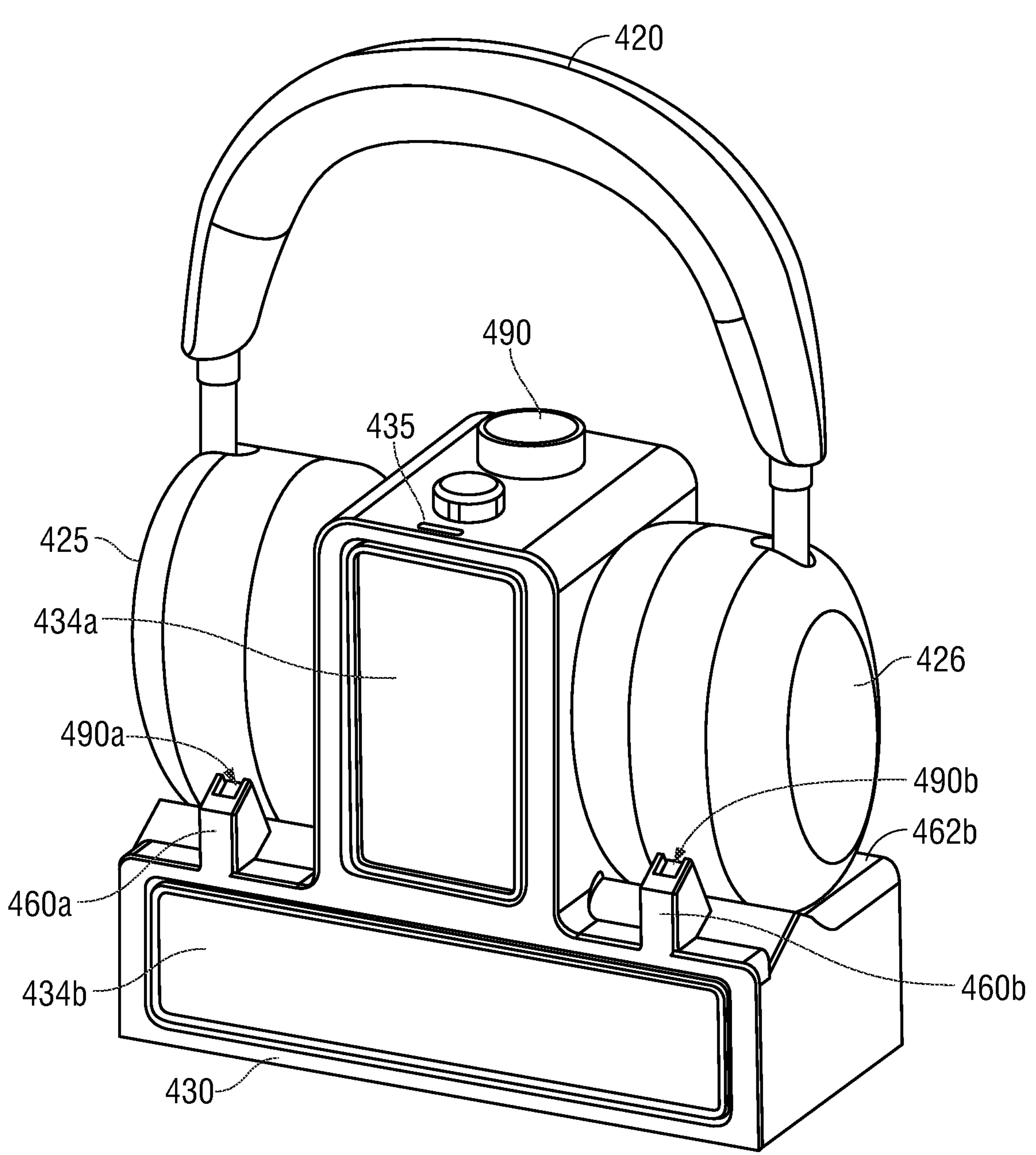
FIG. 4 is a graphical diagram illustrating a perspective view of an audio headset docked with a speaker docking station to automatically route an audio signal from the audio headset to a speaker of the speaker docking station according to an embodiment of the present disclosure.

FIG. 4 is a graphical diagram illustrating a perspective view an audio headset 420 incorporating an automatic audio output device switching system docked with a speaker docking station 430 to automatically route an audio signal from the audio headset to a speaker of the speaker docking station according to an embodiment of the present disclosure. A plurality of electrically conductive audio headset power pins (not shown, but described at 393*a*, 394*a*, 393*b*, and 394*b* of FIG. 3) may be disposed within the audio headset pin connector housings 490*a* and 490*b*, respectively, such that the plurality of audio headset power pins (not shown, but described at 393*a*, 394*a*, 393*b*, and 394*b* of FIG. 3) may operatively couple with a plurality of speaker docking station power pins (not shown, but described at 263*a*, 264*a*, 263*b*, and 264*b* of FIG. 2) disposed within the speaker docking station pin connector housings 460*a* and 460*b* when the audio headset pin connector housing 490*a* or 490*b* are disposed within a speaker docking station pin connector housing 460*a* and 460*b*, respectively. A plurality of electrically conductive audio headset communication pins (not shown, but described at 395*a*, 396*a*, 395*b*, and 396*b* of FIG. 3) may be disposed within the audio headset pin connector housings 490*a* and 490*b*, respectively, such that the plurality of audio headset communication pins (not shown, but described at 395*a*, 396*a*, 395*b*, and 396*b* of FIG. 3) may operatively couple with a plurality of speaker docking station communication pins (not shown, but described at 265*a*, 266*a*, 265*b*, and 266*b* of FIG. 2) disposed within the speaker docking station pin connector housings 460*a* and 460*b* when the audio headset pin connector housing 490*a* or 490*b* is disposed within a speaker docking station pin connector housing 460*a* and 460*b*, respectively.

Electrical current may then pass through the speaker docking station power pins in the speaker docking station pin connector housing 460*a* or 460*b*) to the audio headset power pins 393*a*, 394*a*, 393*b*, or 394*b* in the audio headset pin connector housings 490*a* and 490*b*, supplying power from the speaker docking station power management unit (not shown, but described at 131 of FIG. 1) to the audio headset rechargeable batteries (not shown, but described at 123 of FIG. 1). Upon detection of electrical current received at the audio headset rechargeable batteries from the speaker docking station PMU, the audio headset hardware processor (not shown, but described at 141 of FIG. 1) may instruct the audio headset port router (not shown, but described at 144 of FIG. 1) to route the audio signal received from the information handling system (not shown, but described at 100 of FIG. 1), via the audio headset network interface device (not shown, but described at 143 of FIG. 1) of the audio headset 420, to the speaker docking station 430 via one or more audio headset communication pins, when they are operatively coupled to one or more speaker docking station communication pins, as indicated by the detected audio output device docking switching trigger (e.g., the power detected from the speaker docking station 430 or from a docking sensor such as a pressure sensor).

A speaker docking station audio driver (not shown but described at 136 of FIG. 1) in an embodiment may operatively couple to one or more speaker docking station communication pins housed within the speaker docking station pin connector housings 460*a* and 460*b*, respectively, for receiving an audio signal transmitted by an information handling system or providing a microphone audio sound to the information handling system via the audio headset 420 when the one or more speaker docking station communication pins are operatively coupled with one or more audio headset communication pins.

The speaker docking station audio driver in an embodiment may be operatively coupled to one or more speaker docking station speakers 434*a* or 434*b*, such that the speaker docking station audio driver causes the speaker docking station speakers 434*a* or 434*b* to emit sound according to an audio signal received from an audio headset 420, via one or more speaker docking station communication pins within the speaker docking station pin connector housings 460*a* and 460*b*. The speaker docking station microphone 435 may be operatively coupled in an embodiment to the audio headset port router via the speaker docking station audio driver and the one or more speaker docking station communication pins, such that a recorded audio signal received at the speaker docking station microphone 435 may be transmitted to the audio headset network interface device for the audio headset 420 and the information handling system by the audio headset port router for the audio headset 420. A speaker docking station power management in an embodiment may operatively couple to one or more speaker docking station power pins housed within the speaker docking station pin connector housings 460*a* or 460*b* such that the speaker docking station power management unit may send electrical current to one or more speaker docking station power pins when they are operatively coupled to one or more audio headset power pins.

Figure 5:
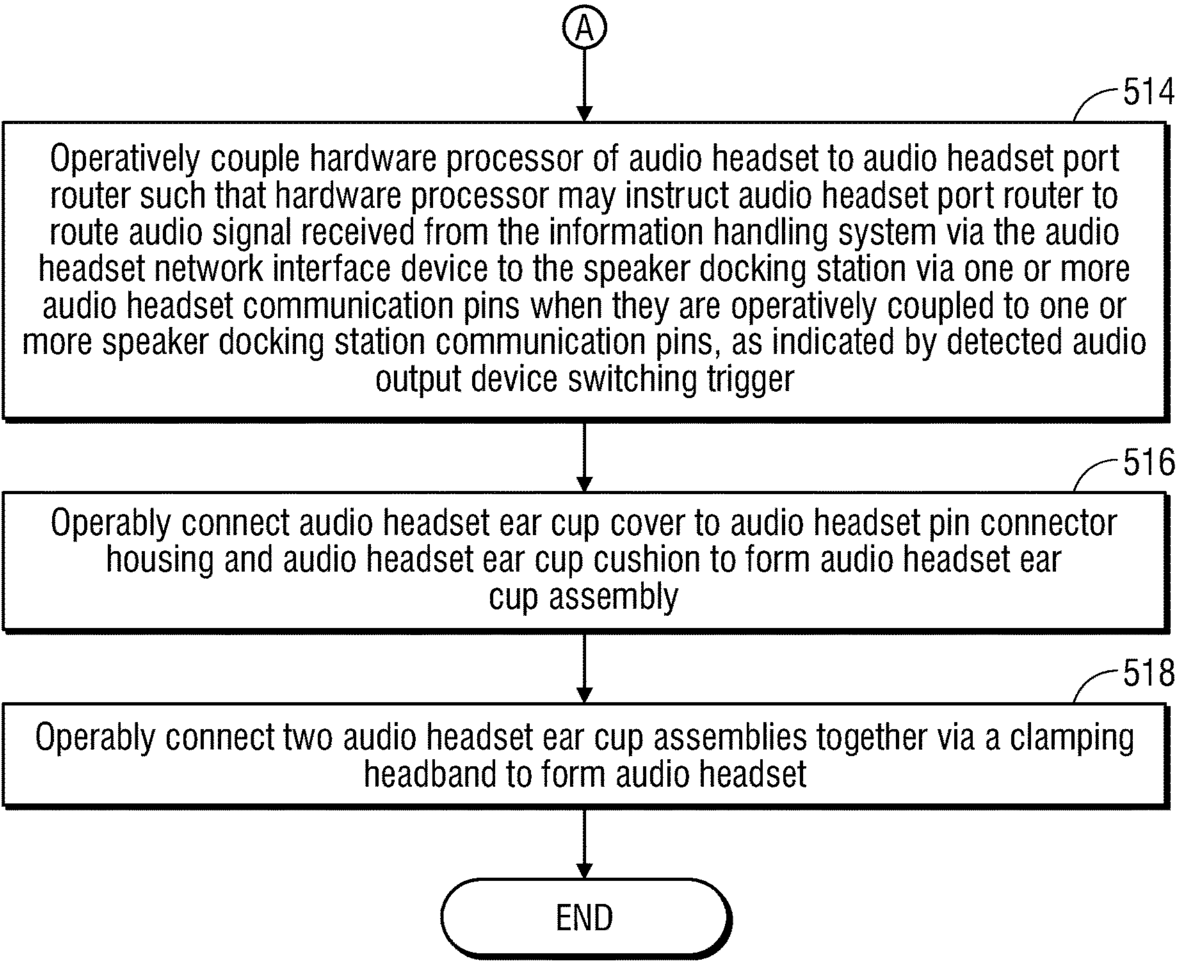
FIG. 5 is a flow diagram illustrating a method of assembling an audio headset incorporating an automatic audio output device switching system according to an embodiment of the present disclosure.

FIG. 5 is a flow diagram illustrating a method of assembling an audio headset incorporating an automatic audio output device switching system and having a plurality of audio headset pin connector housings, each for insertion within a speaker docking station audio pin connector housing according to an embodiment of the present disclosure. As described herein, the automatic audio output device switching system in an embodiment may automatically detect when an audio headset is docked with a speaker docking station that incorporates an external speaker, and automatically direct the audio signal received at the audio headset from an operatively coupled information handling system to an audio driver at the speaker docking station via an electrically conductive connection between communication pins of the audio headset and the speaker docking station that may come into electrically conductive contact with one another upon such a docking. The automatic audio output device switching system in another aspect of an embodiment may also automatically instruct a speaker docking station microphone to record an audio signal and transmit it the audio headset port router via the speaker docking station audio driver. The recorded audio signal received at the speaker docking station microphone may then be transmitted to the audio headset network interface device and the information handling system, via the audio headset port router for the audio headset.

At block 502, an audio headset pin connector housing in an embodiment may be formed and a plurality of electrically conductive audio headset power and communication pins may be disposed within the audio headset pin connector housing, such that the plurality of audio headset power and communication pins may operatively couple with a plurality of speaker docking station power and communication pins when the audio headset pin connector housing is disposed within a speaker docking station pin connector housing. For example, in an embodiment described with respect to FIG. 1, a plurality of audio headset power pins may operatively couple with a plurality of speaker docking station power pins to form electrically conductive connections 151 or 152 when the audio headset pin connector housing is disposed within a speaker docking station pin connector housing. A plurality of audio headset connector pins may operatively couple with a plurality of speaker docking station connector pins to form electrically conductive connections 153 or 154 when the audio headset pin connector housing is disposed within a speaker docking station pin connector housing.

As another example, in an embodiment described with respect to FIG. 3, an audio headset pin connector housing 390*a* or 390*b* in an embodiment may be formed as an exterior portion of an earcup outer cover of 325*a* or 326*b*, respectively. A plurality of electrically conductive audio headset power pins 393*a*, 394*a*, 393*b*, and 394*b* may be disposed within the audio headset pin connector housings 390*a* and 390*b*, respectively, such that the plurality of audio headset power pins 393*a*, 394*a*, 393*b*, and 394*b* may operatively couple with a plurality of speaker docking station power pins (described at 263*a*, 264*a*, 263*b*, and 264*b* of FIG. 2) when the audio headset pin connector housing 390*a* or 390*b* is disposed within a speaker docking station pin connector housing (described at 260*a* and 260*b* of FIG. 2).

In yet another example embodiment described with respect to FIG. 4, a plurality of electrically conductive audio headset power pins (described at 393*a*, 394*a*, 393*b*, and 394*b* of FIG. 3) may be disposed within the audio headset pin connector housings 490*a* and 490*b*, respectively, such that the plurality of audio headset power pins may operatively couple with a plurality of speaker docking station power pins (described at 263*a*, 264*a*, 263*b*, and 264*b* of FIG. 2) disposed within the speaker docking station pin connector housings 460*a* and 460*b* when the audio headset pin connector housing 490*a* or 490*b* is disposed within a speaker docking station pin connector housing 460*a* and 460*b*, respectively. A plurality of electrically conductive audio headset communication pins (described at 395*a*, 396*a*, 395*b*, and 396*b* of FIG. 3) may be disposed within the audio headset pin connector housings 490*a* and 490*b*, respectively, such that the plurality of audio headset communication pins may operatively couple with a plurality of speaker docking station communication pins (described at 265*a*, 266*a*, 265*b*, and 266*b* of FIG. 2) disposed within the speaker docking station pin connector housings 460*a* and 460*b* when the audio headset pin connector housing 490*a* or 490*b* is disposed within a speaker docking station pin connector housing 460*a* and 460*b*, respectively.

An audio headset network interface device in an embodiment at block 504 may be operatively coupled to an audio headset port router capable of routing an audio signal received via the audio headset network interface device from an operatively coupled information handling system through multiple ports. For example, in an embodiment described with respect to FIG. 1, an audio headset network interface device 143 may be operatively coupled to an audio headset port router 144 capable of routing an audio signal received via the audio headset network interface device 143 from an operatively coupled information handling system 100 through multiple ports, such as to the headset audio driver 142 or to the speaker docking station audio driver 136.

At block 506, a headset audio driver for the audio headset may be operatively coupled in an embodiment to a port of an audio headset port router and to one or more audio headset speakers, such that the headset audio driver for the audio headset causes one or more audio headset speakers to emit sound according to the audio signal received from the audio headset network interface device and routed to the headset audio driver by the audio headset port router. For example, in an embodiment described with reference to FIG. 1, a headset audio driver 142 for the audio headset 120 may be operatively coupled to a port of an audio headset port router 144 and to one or more audio headset speakers 122, such that the headset audio driver 142 for the audio headset 120 causes one or more audio headset speakers 122 to emit sound according to the audio signal received from the audio headset network interface device 143 and routed to the headset audio driver 142 by the audio headset port router 144. An audio headset microphone 121 may be operatively coupled in an embodiment to a port of the audio headset port router 144 and to a wired or wireless link (e.g., via antenna system 145) to the information handling system 100, such that a recorded audio signal received at the audio headset microphone 121 may be transmitted to the audio headset network interface device 143 and the information handling system 100 by the audio headset port router 144.

As another example, in an embodiment described with respect to FIG. 3, a headset audio driver (142 of FIG. 1) for the audio headset 320 may be operatively coupled in an embodiment to one or more audio headset speakers 327, such that the headset audio driver for the audio headset 320 causes one or more audio headset speakers 327 to emit sound according to the audio signal received from the audio headset network interface device and routed to the headset audio driver by the audio headset port router. An audio headset microphone 321 may be operatively coupled in an embodiment to a port of the audio headset port router and to a wired or wireless link (e.g., via antenna system) to an operatively coupled information handling system, such that a recorded audio signal received at the audio headset microphone 321 may be transmitted to the audio headset network interface device and the information handling system by the audio headset port router of the audio headset 320.

The audio headset port router in an embodiment at block 508 may be operatively coupled to one or more audio headset communication pins housed within the audio headset pin connector housing. For example, in an embodiment described with respect to FIG. 1, the audio headset port router 144 may be operatively coupled to one or more audio headset communication pins housed within the audio headset pin connector housing for establishing the electrically conductive connections 153 or 154. In another example embodiment described with respect to FIG. 3, the audio headset port router (144 in FIG. 1) may be operatively coupled to one or more audio headset communication pins 395*a*, 396*a*, 395*b*, or 396*b* housed within the audio headset pin connector housings 390*a* or 390*b*, respectively.

At block 510, one or more audio headset batteries may be operatively coupled in an embodiment to one or more audio headset power pins housed within the audio headset pin connector housing for receiving electrical current from speaker docking station. For example, in an embodiment described with respect to FIG. 1, one or more audio headset batteries 123 may be operatively coupled to one or more audio headset power pins housed within the audio headset pin connector housing for receiving electrical current from the speaker docking station 130, via the electrically conductive connection 151 or 152. In another example embodiment described with respect to FIG. 3, one or more audio headset batteries (123 of FIG. 1) may be operatively coupled in an embodiment to one or more audio headset power pins 393*a*, 394*a*, 393*b*, or 394*b* housed within the audio headset pin connector housings 390*a* and 390*b*, respectively for receiving electrical current from a speaker docking station (130 of FIG. 1).

A hardware processor or microprocessor of the audio headset in an embodiment at block 512 executing code instructions of the automatic audio output device switching system may be operatively coupled to the audio headset batteries, such that hardware processor may detect electrical current supplied to the audio headset batteries via one or more audio headset power pins or detect another docking trigger such as from a docking sensor. For example, in an embodiment described with respect to FIG. 1, a hardware processor or microprocessor 141 of the audio headset 120 executing code instructions of the automatic audio output device switching system 140 may be operatively coupled to the audio headset batteries 123, such that hardware processor 141 may detect electrical current supplied to the audio headset batteries 123 via one or more audio headset power pins used to receive electrical current from the speaker docking station 130 via the electrically conductive connection 151 or 152 as a docking switching trigger. The docking switching trigger in various embodiments herein may include detection by a sensor such as a pressure sensor, mechanical sensor, capacitive sensor, hall sensor, light sensor, or other type of sensor for detecting proximity or contact.

In another example embodiment described with respect to FIG. 3, a hardware processor or microcontroller (described at 141 of FIG. 1) of the audio headset 320 executing code instructions of the automatic audio output device switching system may be operatively coupled to the audio headset batteries (described at 123 of FIG. 1), such that hardware processor (described at 141 of FIG. 1) may detect an electrical current supplied to the audio headset batteries (described at 123 of FIG. 1) via one or more audio headset power pins 393*a*, 394*a*, 393*b*, or 394*b* as a docking switching trigger. In other embodiments, a docking sensor may be formed in a housing of the audio headset.

At block 514, the hardware processor or microcontroller of the audio headset in an embodiment may be operatively coupled to the audio headset port router. Such an operative coupling may be via a printed circuit board (PCB), cabling, data communication traces, or any other type of electrically conductive connection used in the art. In an embodiment, the hardware processor may instruct the audio headset port router to route the audio signal received from the information handling system, via the audio headset network interface device, to the speaker docking station via one or more audio headset communication pins, when they are operatively coupled to one or more speaker docking station communication pins, as indicated by detected audio output device docking switching trigger. For example, in an embodiment described with respect to FIG. 1, the hardware processor or microcontroller 141 of the audio headset 120 may be operatively coupled to the audio headset port router 144. In an embodiment, the hardware processor or microcontroller 141 may instruct the audio headset port router 144 to route the audio signal received from or sent to the information handling system 100, via the audio headset network interface device 143 of the audio headset 120, to the speaker docking station 130 via one or more audio headset communication pins used to establish the electrically conductive connections 153 or 154, when they are operatively coupled to one or more speaker docking station communication pins, as indicated by a detected audio output device docking switching trigger. Such an audio output device docking switching trigger in various embodiments herein may include detection by the hardware processor or microcontroller 141 that electrical current is passing from the speaker docking station 130 to the audio headset batteries 123 via the electrically conductive connections 151 or 152, or indication by a sensor 146, such as a pressor sensor, hall sensor, capacitive sensor, mechanical sensor or other type of sensor, that the audio headset 120 is docked at the speaker docking station 130.

In another example embodiment described with respect to FIG. 3, the hardware processor or microcontroller (141 of FIG. 1) of the audio headset 320 may be operatively coupled to the audio headset port router (144 of FIG. 1). In an embodiment, the hardware processor microcontroller may instruct the audio headset port router to route the audio signal received from the information handling system, via the audio headset network interface device (143 of FIG. 1), to or from the speaker docking station (130 of FIG. 1, and 230 of FIG. 2) via one or more audio headset communication pins 395*a*, 396*a*, 395*b*, or 396*b*, when they are operatively coupled to one or more speaker docking station communication pins (265*a*, 266*a*, 265*b*, or 266*b* of FIG. 2) as indicated by a detected audio output device docking switching trigger.

In still another example described with respect to FIG. 4, upon detection of electrical current received at the audio headset rechargeable batteries (described at 123 of FIG. 1) from the speaker docking station PMU (described at 131 of FIG. 1), the audio headset hardware processor or microcontroller (described at 141 of FIG. 1) may instruct the audio headset port router (described at 144 of FIG. 1) to route the audio signal received from or sent to the information handling system (described at 100 of FIG. 1), via the audio headset network interface device (described at 143 of the audio headset 120 of FIG. 1), to the speaker docking station 430 via one or more audio headset communication pins (described at 395*a*, 396*a*, 395*b*, and 396*b* of FIG. 3), when they are operatively coupled to one or more speaker docking station communication pins (described at 265*a*, 266*a*, 265*b*, and 266*b* of FIG. 2), as indicated by the detected audio output device docking switching trigger.

An audio headset ear cup cover housing the headset speaker, the headset microphone, the audio headset network interface device, audio headset port router, headset audio driver, and audio headset hardware processor in an embodiment at block 516 may be operatively coupled to the audio headset pin connector housing and an audio headset ear cup cushion to form an audio headset ear cup assembly. For example, in an embodiment described with reference to FIG. 3, an audio headset ear cup cover 325*a* or 326*a*, housing the headset speaker 327, the headset microphone 321, the audio headset network interface device, audio headset port router, headset audio driver, and audio headset hardware processor in an embodiment (each as described in greater detail above with respect to FIG. 1) may be operatively coupled to the audio headset pin connector housing 490*a* or 490*b*, respectively, and an audio headset ear cup cushion 325*b* or 326*b*, respectively to form an audio headset ear cup assembly 325 or 326, respectively.

At block 518 in an embodiment, two audio headset ear cup assemblies may be operatively coupled together, via a clamping headband, to form the audio headset. For example, in an embodiment, the two audio headset ear cup assemblies 325 and 326 may be operatively coupled together, via a clamping headband 324, to form the audio headset 320. In such a way, an audio headset may be assembled with an automatic audio output device switching system to automatically detect when an audio headset is docked with a speaker docking station that incorporates an external speaker, or is removed from such a speaker docking station, and automatically direct the audio signal received at or sent from the audio headset from an operatively coupled information handling system to an audio driver at the speaker docking station for emission at the speaker docking station speaker, or received from the microphone, or automatically direct the audio signal to a headset audio driver at the audio headset for emission by a speaker at the audio headset or for use of the headset microphone, without any additional steps executed via software by a user, or any handshake procedures between the various audio drivers. The method for assembling an audio headset incorporating an automatic audio output device switching system and having a plurality of audio headset pin connector housings, each for insertion within a speaker docking station audio pin connector housing may then end.

Figure 6:
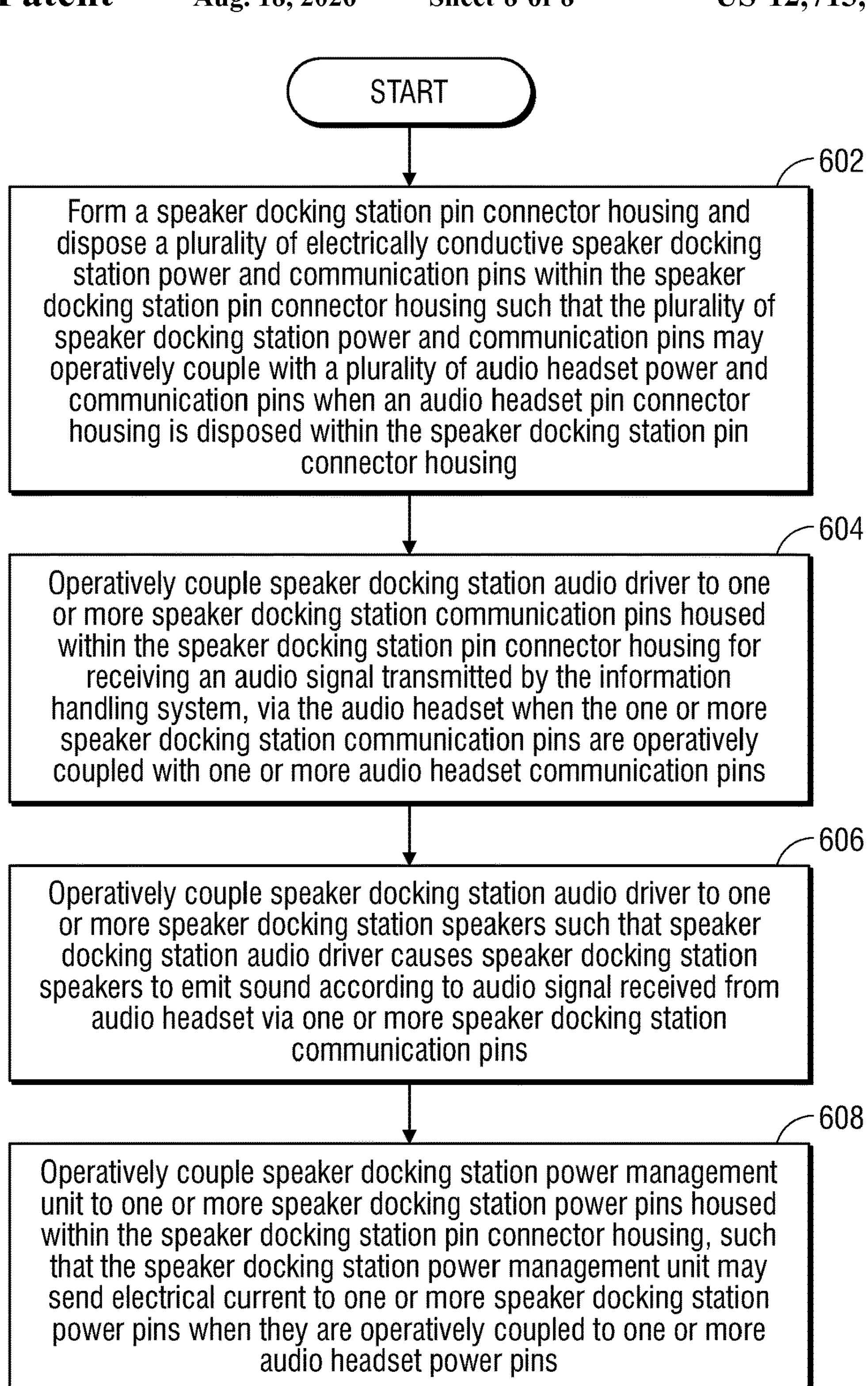
FIG. 6 is a flow diagram illustrating a method of assembling a speaker docking station for receiving a docked audio headset according to an embodiment of the present disclosure.

FIG. 6 is a flow diagram illustrating a method of assembling a speaker docking station having a plurality of speaker docking station pin connector housings, each for receiving an inserted audio headset pin connector housing according to an embodiment of the present disclosure. As described herein, the automatic audio output device switching system in an embodiment may automatically detect when an audio headset is docked with a speaker docking station that incorporates an external speaker and a speaker docking station microphone, and automatically direct the audio signal received at the audio headset from an operatively coupled information handling system to an audio driver at the speaker docking station, or from the speaker docking station microphone to the information handling system via the audio headset, using an electrically conductive connection between communication pins of the audio headset and the speaker docking station that may come into electrically conductive contact with one another upon such a docking.

At block 602, a speaker docking station pin connector housing in an embodiment may be formed and a plurality of electrically conductive speaker docking station power and communication pins may be disposed within the speaker docking station pin connector housing. The speaker docking station power and communication pins may be so disposed such that the plurality of speaker docking station power and communication pins may operatively couple with a plurality of audio headset power and communication pins when an audio headset pin connector housing such as 490*a* and 490*b* in FIG. 4 is disposed within the speaker docking station pin connector housing such as 460*a* and 460*b* of FIG. 4. For example, in an embodiment described with respect to FIG. 1, a plurality of audio headset power pins may operatively couple with a plurality of speaker docking station power pins to form electrically conductive connections 151 or 152 when the audio headset pin connector housing is disposed within a speaker docking station pin connector housing. A plurality of audio headset connector pins may operatively couple with a plurality of speaker docking station connector pins to form electrically conductive connections 153 or 154 when the audio headset pin connector housing is disposed within a speaker docking station pin connector housing.

In another example embodiment described with respect to FIG. 2, a speaker docking station pin connector housing 260*a* or 260*b* may be formed as an exterior portion of the speaker docking station 230. A plurality of electrically conductive speaker docking station power pins 263*a* and 264*a* and a plurality of electrically conductive speaker docking station communication pins 265*a* and 266*a* may be disposed within a first of the speaker docking station pin connector housings 260*a*. A plurality of electrically conductive speaker docking station power pins 263*b* and 264*b* and a plurality of electrically conductive speaker docking station communication pins 265*b* and 266*b* may be disposed within a second of the speaker docking station pin connector housings 260*b*. In some embodiments, only one speaker docking station pin connector housing (e.g., 260*a* or 260*b*) may be formed to house the various speaker docking station power and communication pins (e.g., 263*a*, 264*a*, 265*a*, and 266*a*, or 263*b*, 264*b*, 265*b*, and 266*b*, respectively). The speaker docking station power pins 263*a*, 264*a*, 263*b*, and 264*b* and the speaker docking station communication pins 265*a*, 266*a*, 265*b*, and 266*b* may be so disposed within their respective speaker docking station pin connector housings 260*a* and 260*b* such that the plurality of speaker docking station power pins 263*a*, 263*a*, 263*b*, and 264*b* and the plurality of speaker docking station communication pins 265*a*, 266*a*, 265*b*, and 266*b* may operatively couple with a plurality of audio headset power and communication pins when an audio headset pin connector housing is disposed within the speaker docking station pin connector housings 260*a* and 260*b*.

A speaker docking station audio driver in an embodiment at block 604 may operatively couple to one or more speaker docking station communication pins housed within the speaker docking station pin connector housing via a PCB or cabling. The one or more speaker docking station communication pins operate to receive an audio signal transmitted by the information handling system, via the audio headset, when the one or more speaker docking station communication pins are operatively coupled with one or more audio headset communication pins, in some embodiments. For example, in an embodiment described with respect to FIG. 1, a speaker docking station audio driver 136 may operatively couple to one or more speaker docking station communication pins housed within the speaker docking station pin connector housing for receiving an audio signal transmitted via the electrically conductive connection 153 or 154 by the information handling system 100, via the audio headset 120 when the one or more speaker docking station communication pins are operatively coupled with one or more audio headset communication pins to establish the electrically conductive connection 153 or 154.

As another example, in an embodiment described with respect to FIG. 2, a speaker docking station audio driver (e.g., 136 of FIG. 1) may operatively couple to one or more speaker docking station communication pins 265*a*, 266*a*, 265*b*, and 266*b* housed within the speaker docking station pin connector housings 260*a* and 260*b*, respectively, for receiving or sending an audio signal transmitted by or to an information handling system (e.g., 100 of FIG. 1), via an audio headset when the one or more speaker docking station communication pins 265*a*, 266*a*, 265*a*, or 266*b* are operatively coupled with one or more audio headset communication pins.

In yet another example described with respect to FIG. 4, a speaker docking station audio driver may operatively couple to one or more speaker docking station communication pins housed within the speaker docking station pin connector housings 460*a* and 460*b*, respectively, for receiving an audio signal transmitted by an information handling system, via an audio headset 420 when the one or more speaker docking station communication pins are operatively coupled with one or more audio headset communication pins (described at 395*a*, 396*a*, 395*b*, and 396*b* of FIG. 3).

At block 606, the speaker docking station audio driver in an embodiment may be operatively coupled to one or more speaker docking station speakers, such that speaker docking station audio driver causes speaker docking station speakers to emit sound according to an audio signal received from an audio headset, via one or more speaker docking station communication pins. For example, in an embodiment described with respect to FIG. 1, the speaker docking station audio driver 136 may be operatively coupled to one or more speaker docking station speakers 134, such that speaker docking station audio driver 136 causes speaker docking station speakers 136 to emit sound according to the audio signal received from the audio headset 120, via the electrically conductive connections 153 or 154 established using the one or more speaker docking station communication pins.

In another example embodiment described with respect to FIG. 2, the speaker docking station audio driver (e.g., 136 in FIG. 1) may be operatively coupled to one or more speaker docking station speakers 234*a* or 234*b*, such that speaker docking station audio driver (e.g., 136 in FIG. 1) causes the speaker docking station speakers 234*a* or 234*b* to emit sound according to an audio signal received from an audio headset, via one or more speaker docking station communication pins 265*a*, 266*a*, 265*b*, or 266*b*.

In another example embodiment described with reference to FIG. 4, the speaker docking station audio driver may be operatively coupled to one or more speaker docking station speakers 434*a* or 434*b*, such that the speaker docking station audio driver causes the speaker docking station speakers 434*a* or 434*b* to emit sound according to an audio signal received from an audio headset 420, via one or more speaker docking station communication pins within the speaker docking station pin connector housings 460*a* and 460*b*.

A speaker docking station power management unit in an embodiment at block 608 may operatively couple to one or more speaker docking station power pins housed within the speaker docking station pin connector housing, via a printed circuit board (PCB) or power cabling, according to embodiments herein. The speaker docking station power management unit may send electrical current to one or more speaker docking station power pins when they are operatively coupled to one or more audio headset power pins. For example, in an embodiment described with reference to FIG. 1, a speaker docking station power management unit (PMU) 131 may operatively couple to one or more speaker docking station power pins housed within the speaker docking station pin connector housing to establish the electrically conductive connections 151 or 152, such that the speaker docking station power management unit 131 may send electrical current to one or more speaker docking station power pins when they are operatively coupled to one or more audio headset power pins to establish the electrically conductive connections 151 or 152. The speaker docking station power management unit 131 may supply power to the speaker docking station 130, via a battery 132 or an alternating current (A/C) power adapter 133 and to one or more components of the speaker docking station 130, including the speaker docking station audio driver 136, the speaker 134, the microphone 135, or other components of the speaker docking station 130. Additionally, when the audio headset 120 is docked with the speaker docking station 130, such as when the one or more speaker docking station power pins are operatively coupled to the one or more audio headset power pins to establish the electrically conductive connections 151 or 152, the speaker docking station power management unit 131 may supply power to the audio headset 120, via a battery 132 or an alternating current (A/C) power adapter 133 and to one or more components of the audio headset 120, including the batteries 123, or other components of the audio headset 120.

In another example embodiment described with respect to FIG. 2, a speaker docking station power management unit may operatively couple to one or more speaker docking station power pins 263*a*, 264*a*, 263*b*, or 264*b* housed within the speaker docking station pin connector housings 260*a* or 260*b* such that the speaker docking station power management unit may send electrical current to one or more speaker docking station power pins 263*a*, 264*a*, 263*b*, or 264*b* when they are operatively coupled to one or more audio headset power pins.

In yet another example embodiment described with respect to FIG. 4, a speaker docking station power management unit (described at 131 in FIG. 1) may operatively couple to one or more speaker docking station power pins (described at 263*a*, 264*a*, 263*b*, or 264*b* of FIG. 2) housed within the speaker docking station pin connector housings 460*a* or 460*b* such that the speaker docking station power management unit (described at 131 in FIG. 1) may send electrical current to one or more speaker docking station power pins (described at 263*a*, 264*a*, 263*b*, or 264*b* of FIG. 2) when they are operatively coupled to one or more audio headset power pins. The speaker docking station housing, including the speakers and microphone, may then be assembled into the speaker docking station.

In such a way, a speaker docking station may be assembled for docking with an audio headset with an automatic audio output device switching system to automatically detect when an audio headset is docked with a speaker docking station that incorporates an external speaker, or is removed from such a speaker docking station, and automatically direct the audio signal received at the audio headset from an operatively coupled information handling system to an audio driver at the speaker docking station for emission at the speaker docking station speaker, or automatically direct the audio signal to a headset audio driver at the audio headset for emission, via headset speakers at the audio headset, without any additional steps executed via software by a user, or any handshake procedures between the various audio drivers. The automatic audio output device switching system may also automatically direct a recorded audio signal received at either a microphone of the audio headset or a microphone of the speaker docking station to an operatively coupled information handling system, via the audio headset port router and network interface device, without any additional steps executed via software by a user, or any handshake procedures between the various audio drivers. The method for assembling a speaker docking station having a plurality of speaker docking station pin connector housings, each for receiving an inserted audio headset pin connector housing may then end.

The blocks of the flow diagram of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An audio headset having an automatic audio output device switching system comprising:

an audio headset speaker;

an audio headset communication pin that is electrically conductive disposed within an audio headset pin connector housing for operatively coupling with a speaker docking station communication pin upon insertion of the audio headset pin connector housing within a speaker docking station pin connector housing;

an audio headset port router operably connected to a headset audio driver of the audio headset, the audio headset communication pin, and an audio headset network interface device, for routing an audio signal received via the audio headset network interface device from an operatively coupled information handling system to the audio headset communication pin when operatively coupled to a docking speaker in a speaker docking station and to the headset audio driver and the audio headset speaker; and a hardware processor executing code instructions of the automatic audio output device switching system to detect a first headset docking triggering event for automatically switching audio output devices and to instruct the audio headset port router to route the audio signal, received via the audio headset network interface device, to the speaker docking station for output at the docking speaker, via the audio headset communication pin coupled to the speaker docking station communication pin when the audio headset is detected as operatively coupled at the speaker docking station.

2. The audio headset having an automatic audio output device switching system of claim 1 further comprising:

the headset audio driver operatively coupled to the audio headset speaker for emitting sound according to the audio signal as received at the headset audio driver when the audio headset is undocked from the speaker docking station.

3. The audio headset having an automatic audio output device switching system of claim 1 further comprising:

an ear cup cover with the audio headset speaker operatively coupled to the audio headset pin connector housing and an ear cup cushion to form a first ear cup assembly; and the first ear cup assembly operably connected to a second ear cup assembly via a clamping headband to form the audio headset.

4. The audio headset having an automatic audio output device switching system of claim 1, wherein the first headset docking triggering event for switching audio output devices is determination by an audio headset docking sensor that the audio headset pin connector housing has been inserted within the speaker docking station pin connector housing.

5. The audio headset having an automatic audio output device switching system of claim 1 further comprising:

an electrically conductive audio headset power pin disposed within the audio headset pin connector housing for receiving an electrical current from the speaker docking station when the audio headset is docked in the speaker docking station; and wherein the first headset docking triggering event for switching audio output devices is the detection of receipt of the electrical current from the speaker docking station via the audio headset power pin by the automatic audio output device switching system.

6. The audio headset having an automatic audio output device switching system of claim 1 further comprising:

the hardware processor executing code instructions of the automatic audio output device switching system to detect a second headset docking triggering event for switching audio output devices indicating undocking of the audio headset from the speaker docking station and to instruct the audio headset port router to reroute the audio signal away from the audio headset communication pin and toward the headset audio driver for emission of sound according to the audio signal via the headset speaker.

7. The audio headset having an automatic audio output device switching system of claim 1, wherein the audio signal is received via a wireless link established between an audio headset antenna system of the audio headset network interface device and an information handling system.

8. A method for manufacturing an audio headset including an automatic audio output device switching system comprising:

disposing a first audio headset speaker in a first earcup assembly of the audio headset;

disposing an audio headset communication pin that is electrically conductive within an audio headset pin connector housing on the first earcup assembly for operative coupling with a speaker docking station communication pin upon insertion of the audio headset pin connector housing within a speaker docking station pin connector housing;

operatively coupling an audio headset port router and an audio headset antenna system of an audio headset network interface device for routing an audio signal received via the audio headset antenna system from a wirelessly coupled information handling system to a hardware processor executing code instructions of a headset audio driver of the audio headset via a printed circuit board and the first audio headset speaker and to the audio headset communication pin and a speaker docking station with a docking station speaker depending on instructions from the hardware processor executing code instructions of an automatic audio output device switching system for the audio headset;

operatively coupling the headset audio driver to the first audio headset speaker for emitting sound according to the audio signal received via the headset antenna when the automatic audio output device switching system detects the audio headset as undocked from the speaker docking station; and operatively coupling the hardware processor, to detect a first headset docking triggering event for switching audio output devices indicating that the audio headset is docked in the speaker docking station, and to instruct the audio headset port router to reroute the audio signal received via the audio headset antenna away from the headset audio driver and to the speaker docking station for output via the audio headset communication pin to the docking station speaker.

9. The method of claim 8 further comprising:

operatively coupling the automatic audio output device switching system to the audio headset port router and the headset audio driver to cease emission of sound from the first audio headset speaker according to the audio signal received via the audio headset antenna when the audio headset is detected as docked at the speaker docking station.

10. The method of claim 8 further comprising:

operatively coupling the automatic audio output device switching system to the audio headset port router and the headset audio driver to detect a second headset docking triggering event for switching audio output devices, and to instruct the audio headset port router to reroute the audio signal away from the audio headset communication pin and to the headset audio driver for emitting sound via the audio headset speaker.

11. The method of claim 8 further comprising:

operatively coupling an ear cup cover to the audio headset pin connector housing and an ear cup cushion to form the first ear cup assembly; and operatively coupling the first ear cup assembly to a second ear cup assembly via a clamping headband to form the audio headset.

12. The method of claim 8 further comprising:

operatively coupling an audio headset docking sensor that is a pressure sensor at the audio headset pin connector housing to the automatic audio output device switching system for determination that audio headset pin connector housing has been inserted within the speaker docking station pin connector housing indicating that the audio headset is docked in the speaker docking station.

13. The method of claim 8 further comprising:

disposing an electrically conductive audio headset power pin within the audio headset pin connector housing for receiving an electrical current from the speaker docking station; and operatively coupling the electrically conductive audio headset power pin to an audio headset rechargeable battery for charging the headset rechargeable battery with the electrical current received from the speaker docking station.

14. The method of claim 8 further comprising:

disposing an electrically conductive audio headset power pin within the audio headset pin connector housing for receiving an electrical current from the speaker docking station; and operatively coupling the hardware processor to the audio headset power pin to detect the first headset docking triggering event for switching audio output devices as the receipt of the electrical current from the speaker docking station via the audio headset power pin.

15. An audio headset having an automatic audio output device switching system comprising:

an audio headset speaker;

an audio headset communication pin that is electrically conductive disposed within an audio headset pin connector housing for operatively coupling with a speaker docking station communication pin upon insertion of the audio headset pin connector housing within a speaker docking station pin connector housing;

an audio headset port router operably connected to a hardware processor executing code instructions of a headset audio driver of the audio headset, the audio headset communication pin, and an audio headset network interface device, the audio headset port router for routing an audio signal received via the audio headset network interface device from an operatively coupled information handling system to the audio headset communication pin for transfer to a speaker docking station and a docking station speaker thereon and to the headset audio driver for transfer to the audio headset speaker depending on detection of a docking state with the speaker docking station;

an audio headset power pin that is electrically conductive disposed within the audio headset pin connector housing for receiving an electrical current from the speaker docking station when the audio headset is docked in a speaker docking station; and a hardware processor executing code instructions of the automatic audio output device switching system for detecting receipt of the electrical current from the speaker docking station via the audio headset power pin and instructing the audio headset port router to route the audio signal received via the audio headset network interface device from the operatively coupled information handling system to a speaker docking station for output at the docking station speaker, via the audio headset communication pin when the audio headset is docked in the speaker docking station.

16. The audio headset having an automatic audio output device switching system of claim 15 further comprising:

the hardware processor executing code instructions of the automatic audio output device switching system for instructing the audio headset port router to route the audio signal received via a microphone of the speaker docking station to the operatively coupled information handling system via the audio headset network interface device and the audio headset communication pin when the audio headset is docked in the speaker docking station.

17. The audio headset having an automatic audio output device switching system of claim 15 further comprising:

the audio headset speaker ceasing sound emission of the audio signal received via the audio headset network interface device from the operatively coupled information handling system is routed to the audio headset communication pin when the audio headset is docked in the speaker docking station.

18. The audio headset having an automatic audio output device switching system of claim 15 further comprising:

an ear cup cover including the audio headset speaker operatively coupled to the audio headset pin connector housing and an ear cup cushion to form a first ear cup assembly; and the first ear cup assembly operatively coupled to a second ear cup assembly via a clamping headband to form the audio headset.

19. The audio headset having an automatic audio output device switching system of claim 15 further comprising:

the hardware processor executing code instructions of the automatic audio output device switching system for detecting cessation of delivery of the electrical current from the speaker docking station via the audio headset power pin and instructing the audio headset port router to route the audio signal received via the audio headset network interface device from the operatively coupled information handling system to the headset audio driver and the audio headset speaker when the audio headset is detected as undocked from the speaker docking station.

20. The audio headset having an automatic audio output device switching system of claim 15, wherein the audio signal is received via a wireless link established between the audio headset network interface device and an information handling system.

* * * * *